US012801942B2

(12) United States Patent
Suzuki et al.

(10) Patent No.: US 12,801,942 B2
(45) Date of Patent: Nov. 17, 2026

(54) ANALYSIS DEVICE, ANALYSIS METHOD, AND RECORDING MEDIUM

(71) Applicant: Hitachi, Ltd., Tokyo (JP)

(72) Inventors: Mayumi Suzuki, Tokyo (JP); Shinji Tarumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 846 days.

(21) Appl. No.: 18/199,188

(22) Filed: May 18, 2023

(65) Prior Publication Data

US 2023/0385657 A1 Nov. 30, 2023

(30) Foreign Application Priority Data

May 26, 2022 (JP) ................................ 2022-085893

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS

2015/0254554 A1* 9/2015 Kato ...................... G06N 3/084
706/21
2017/0364826 A1* 12/2017 Mitarai .................. G06N 20/10
2019/0073587 A1* 3/2019 Takagi ..................... G06N 3/08
2019/0188598 A1* 6/2019 Ishida ..................... G06F 17/18
2019/0279037 A1* 9/2019 Tanimoto .............. G06F 18/232
2019/0385083 A1* 12/2019 Yokoyama .............. H04L 67/10
2020/0234082 A1* 7/2020 Toda ....................... G06N 3/084
2020/0293887 A1 9/2020 De Brouwer et al.

(Continued)

FOREIGN PATENT DOCUMENTS

WO 2021/059607 A1 4/2021

OTHER PUBLICATIONS

Anonymous: “Federated Mixture of Experts”, Sep. 28, 2020 (Sep. 28, 2020), pp. 1-19, XP055788414, Retrieved from the Internet: URL ;https://openreview.net/ pdf?id=YgrdmztE40Y [retrieved on Mar. 22, 2021].

(Continued)

*Primary Examiner* — David E Choi
(74) *Attorney, Agent, or Firm* — PROCOPIO, CORY, HARGREAVES & SAVITCH LLP

(57) ABSTRACT

An object of the present invention is to achieve generation of a prediction model appropriate for each site without a necessity of transfer of data located at a plurality of sites to the outside of the sites.

An analysis device capable of communicating with a plurality of learning devices includes a reception unit (301, 401, 1501) that receives transformed features obtained by transforming, in accordance with a predetermined rule, features contained in pieces of learning data individually retained in the plurality of learning devices, a distribution analysis unit (302) that analyzes distributions of a plurality of the features of the plurality of learning devices on the basis of the transformed features received by the reception unit (301, 401, 1501) for each of the learning devices, and an output unit (304, 1504) that outputs a distribution analysis result analyzed by the distribution analysis unit (302).

20 Claims, 12 Drawing Sheets

(56) References Cited

U.S. PATENT DOCUMENTS

| | | | | |
|---|---|---|---|---|
| 2022/0108177 | A1 | 4/2022 | Samek et al. | |
| 2022/0172844 | A1 | 6/2022 | Jehara | |
| 2022/0222924 | A1* | 7/2022 | Pan | G06F 16/55 |
| 2023/0018893 | A1* | 1/2023 | Kim | G06N 3/082 |
| 2023/0082173 | A1* | 3/2023 | Li | G06N 20/00 713/168 |
| 2023/0196123 | A1* | 6/2023 | Kubota | G06N 3/09 706/15 |
| 2023/0306003 | A1* | 9/2023 | Jain | G06F 16/254 |
| 2023/0385638 | A1* | 11/2023 | Takimoto | G06N 3/044 |
| 2023/0385657 | A1* | 11/2023 | Suzuki | G06N 3/045 |
| 2024/0169204 | A1* | 5/2024 | Iwata | G06N 20/00 |
| 2024/0177060 | A1* | 5/2024 | Tanimoto | G06N 7/01 |
| 2024/0202544 | A1* | 6/2024 | Lee | G06N 3/063 |
| 2024/0221946 | A1* | 7/2024 | Shin | G16H 50/20 |
| 2024/0256896 | A1* | 8/2024 | Tarumi | G06N 3/098 |
| 2025/0021825 | A1* | 1/2025 | Yang | G06N 3/08 |
| 2025/0335822 | A1* | 10/2025 | Tarumi | G06N 20/00 |

OTHER PUBLICATIONS

Briggs, Christopher et al.: "Federated learning with hierarchical clustering of local updates to improve training on non-IID data", 2020 International Joint Conference on Neural Networks (IJCNN), IEEE, Jul. 19, 2020 (Jul. 19, 2020), pp. 1-9, XP033831791, DOI; 10. 1109/ IJCNN48605.2020.9207469 [retrieved on Sep. 25, 2020].

Extended European Search Report received in corresponding EP Application No. 23171268.8, dated Oct. 5, 2023, in 12 pages.

McMahan, H. Brendan, et al., "Communication-Efficient Learning of Deep Networks from Decentralized Data", Proceedings of the 20th International Conference on Artificial Intelligence and Statistics (AISTATS) 2017, Fort Lauderdale, Florida, USA. JMLR: W&CP vol. 54, pp. 1273-1282, Copyright 2017, in 10 pages.

* cited by examiner

ANALYSIS DEVICE, ANALYSIS METHOD, AND RECORDING MEDIUM

CLAIM OF PRIORITY

The present application claims priority from Japanese patent application JP 2022-85893 filed on May 26, 2022, the content of which is hereby incorporated by reference into this application.

BACKGROUND OF THE INVENTION

1. Field of the Invention

The present invention relates to an analysis device, an analysis method, and a recording medium storing an analysis program for analyzing data.

2. Description of the Related Art

Machine learning is one of technologies realizing artificial intelligence (AI). A machine learning technology is constituted by a learning process and a predicting process. First, the learning process calculates a learning parameter which minimizes an error between an actual value (true value) and a predicted value obtained from a feature vector corresponding to input. Next, the predicting process calculates a new predicted value by using data not used for learning (hereinafter referred to as test data).

Calculation methods and computation methods have been devised to obtain a learning parameter which maximizes prediction accuracy of a predicted value. For example, a method called a perceptron outputs a predicted value by using a feature vector corresponding to input and a computation result of a linear combination of weight vectors. A neural network, which is called a multi-perceptron as well, has an ability of solving a linearly inseparable problem by stacking a plurality of perceptrons in multilayers. Deep learning is a method which introduces a new technology, such as dropping out, to a neural network, and has attracted considerable attention as a method capable of achieving high prediction accuracy. As can be seen, development of machine learning technologies has been promoted with an aim to improve prediction accuracy. The prediction accuracy thus improved is approaching an ability exceeding that of humans.

There still exist problems other than prediction accuracy to achieve social implementation of machine learning technologies. For example, these problems include security problems, update methods of models after delivery, and limits to use of finite resources such as memories.

Problems concerning security include data confidentiality. For generating a prediction model by using data containing personal information, such as data in a medical field, a financial field, or the like, data having high confidentiality is difficult in some cases to transfer to the outside of a site where the data is retained. Generally, machine learning is capable of achieving high prediction accuracy by using a large volume of data for learning.

When only data acquired at one site is used for learning, a model obtained by this learning may become available only in a considerably localized range due to a small number of samples of the data, characteristics of a region where the data has been collected, or other factors. Accordingly, it is necessary to develop a machine learning technology capable of generating a prediction model which achieves high prediction by using a wide variety of data at respective sites without a necessity of data transfer from the sites.

U.S. Published Application No. 2020/0293887 (hereinafter, referred to as Patent Document 1) discloses a method and a system each provided with a federated learning model for a healthcare application. This federated learning system is constituted by a plurality of edge devices of end users, one or more federation learner update repositories, and one or more clouds. Each of the edge devices has a federation learner model configured to transmit a tensor to the federation learner update repository. The cloud has a federation learner model configured to transmit a tensor to the federation learner update repository. The federation learner update repository has a backend configuration formed to transmit model update to the edge devices and the cloud.

PCT Patent Publication No. WO2021/059607 (hereinafter, referred to as Patent Document 2) discloses a machine learning system which executes federated learning. This machine learning system synthesizes learning models of respective client terminals with a master model of an integration server before start of learning by each of a plurality of the client terminals. Each of the client terminals executes machine learning of the learning model by using data stored in a medical institution, and transmits a learning result to the integration server. The integration server divides the plurality of client terminals into a plurality of client clusters, and integrates learning results for each of the client clusters to generate master model candidates. The integration server evaluates inference accuracy of each of the master model candidates. If any master model candidate exhibiting accuracy lower than an accuracy threshold is detected, the integration server extracts the client terminal corresponding to an accuracy lowering factor from the client cluster used for generation of this master model candidate.

A non-patent document of H. Brendan McMahan, Eider Moore, Daniel Ramage, Seth Hampson and Blaise Aguera y Arcas, "Communication-efficient learning of deep networks from decentralized data," In Artificial Intelligence and Statistics, pp. 1273-1282, 2017 (hereinafter, referred to as Non-Patent Document 1) discloses a practical method of deep network federated learning based on averaging of iteration models. This federated learning performs learning by using respective data of respective sites while designating one common model as an initial value, and generates a prediction model. Model parameter information associated with the generated prediction model is transmitted to a server. A process for generating a global prediction model on the basis of the model parameter information associated with the prediction model is repeatedly performed using coefficients corresponding to a volume of data learned by the server. Finally, a global prediction model achieving high prediction accuracy is generated for data of all sites.

SUMMARY OF THE INVENTION

The method and the system according to Patent Document 1 smooths group biases for each of the end users. Accordingly, generation of a prediction model according to characteristics of each of the end users is not considered.

The machine learning system according to Patent Document 2 identifies a site where desired prediction accuracy is difficult to achieve, and again executes federated learning at sites other than this site. However, repetitive execution of federated learning is a redundant way of learning which requires relearning of data once learned over and over again.

By the federated learning technology according to Non-Patent Document 1, a global prediction model exhibiting low prediction performance for data of any sites may be generated depending on a small number of samples of data collected at each site or depending on variations in characteristics of data, such as characteristics of regions where the pieces of data are collected.

An object of the present invention is to achieve generation of a prediction model appropriate for each site without a necessity of transfer of data located at a plurality of sites to the outside of the sites.

An analysis device according to an aspect of the invention disclosed in the present application is directed to an analysis device capable of communicating with a plurality of learning devices. The analysis device includes a reception unit that receives transformed features obtained by transforming, in accordance with a predetermined rule, features contained in pieces of learning data individually retained in the plurality of learning devices, a distribution analysis unit that analyzes distributions of a plurality of the features of the plurality of learning devices on the basis of the transformed features received by the reception unit for each of the learning devices, and an output unit that outputs a distribution analysis result analyzed by the distribution analysis unit.

According to a typical embodiment of the present invention, generation of a prediction model appropriate for each site is achievable without a necessity of transfer of data located at a plurality of sites to the outside of the sites. Problems, configurations, and effects other than those described above will be clarified in the light of description of embodiments presented below.

DESCRIPTION OF THE PREFERRED EMBODIMENTS

An analysis device transforms characteristics of data located at a plurality of sites, without transferring the data to the outside of the respective sites, and executes analysis of the characteristics of the data of the respective sites after transferring the data to the outside of the sites. In this manner, the analysis device executes the following displays included in a model construction method or in a presentation process of grouping appropriate for each site.

(A) display of a clustering result obtained on the basis of distances between transformed features obtained by transforming features contained in learning data of the respective sites (B) display of a clustering result obtained by score calculation using federated learning In these displays, (A) will be described as Embodiment 1, and (B) will be described as Embodiment 2.

Embodiment 1

<Federated Learning>

Figure 1:
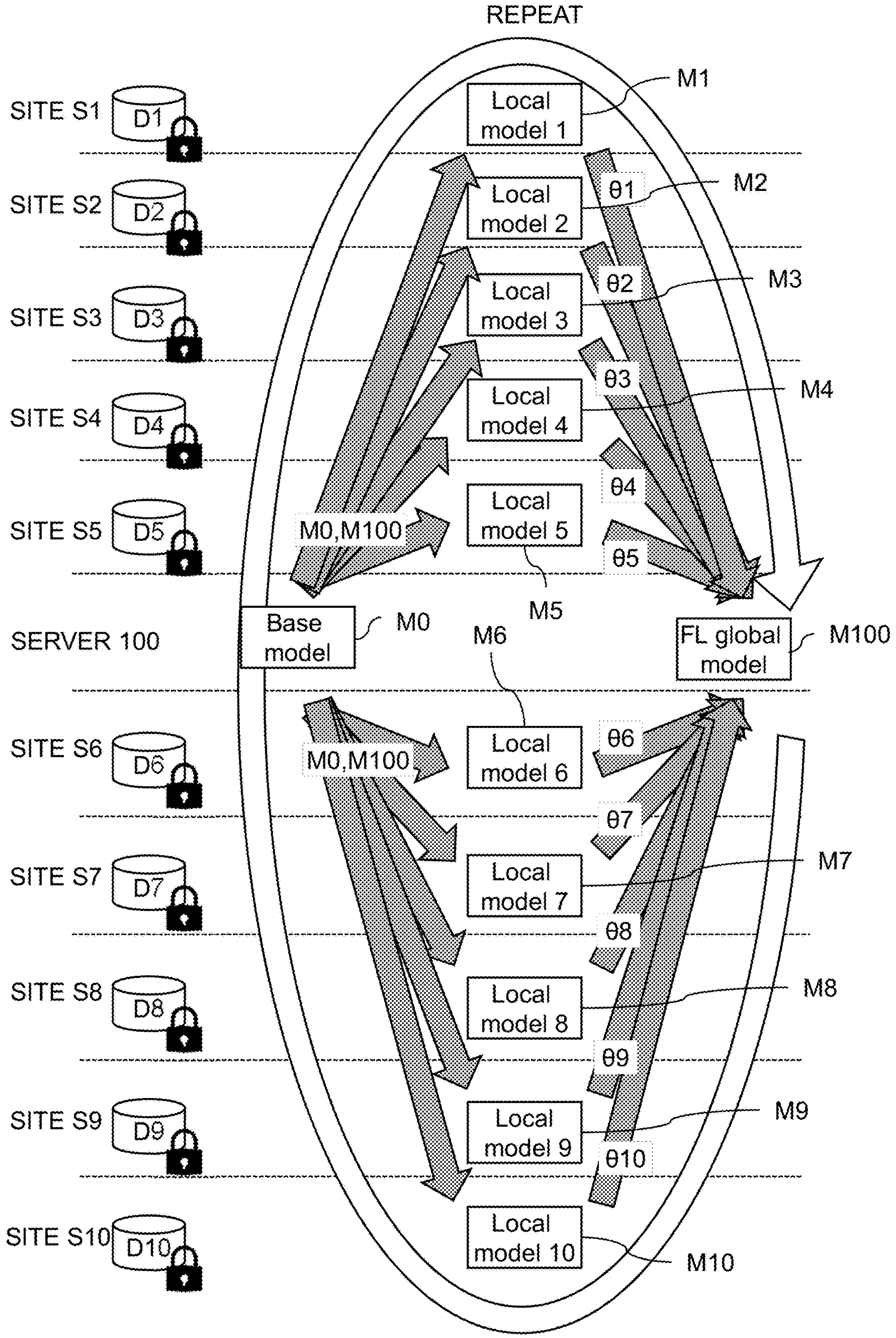
FIG. 1 is an explanatory diagram depicting an example of federated learning.

FIG. 1 is an explanatory diagram depicting an example of federated learning. It is assumed that a plurality of sites corresponding to learning devices (e.g., ten sites S1 to S10 in FIG. 1) retain pieces of learning data D1 to D10 (each will simply be referred to as learning data D where distinction between these pieces of data is unnecessary), respectively, and that transfer of the pieces of learning data D1 to D10 to the outside of the sites S1 to S10 is prohibited.

A server 100 is an analysis device which integrates prediction models M1 to M10 (each will simply be referred to as a prediction model M where distinction between these models is unnecessary) generated at the sites S1 to S10 (each will simply be referred to as a site S where distinction between these sites is unnecessary), respectively. The server 100 has a prediction model (hereinafter referred to as a base prediction model) M0 corresponding to a base. The base prediction model M0 may be either an unlearned neural network or a learned neural network for which a model parameter such as a weight and a bias has been set.

The sites S1 to S10 are computers that have the pieces of learning data D1 to D10 and generate the prediction models M1 to M10 by using the pieces of learning data D1 to D10, respectively. Each of the pieces of learning data D1 to D10 is a combination of training data corresponding to input and ground truth data.

First, the server 100 transmits the base prediction model M0 to the sites S1 to S10. The sites S1 to S10 perform learning by using the pieces of learning data D1 to D10, respectively, and the base prediction model M0, to generate the prediction models M1 to M10, respectively.

The sites S1 to S10 transmit model parameters θ1 to θ10 (each will simply be referred to as a model parameter θ1 where distinction between these parameters is unnecessary), such as weights and biases, of the prediction models M1 to M10, respectively, to the server 100. The server 100 executes an integration process for integrating the received model parameters θ1 to θ10 to generate an integrated prediction model M100.

The server 100 repeats an update process for the integrated prediction model M100 until the generated integrated prediction model M100 achieves desired prediction accuracy. Note that the sites S1 to S10 may transmit gradients of the model parameters θ1 to θ10 of the prediction models M1 to M10 to the server 100, respectively. The sites S1 to S10 respectively transmit the model parameters θ1 to θ10 of the prediction models M1 to M10, such as weights and biases, to the server 100.

The integration process is a process for calculating an average value of the model parameters θ1 to θ10. If each of the pieces of learning data D1 to D10 has a different number of samples for each, a weighted average may be calculated on the basis of each number of samples of the pieces of learning data D1 to D10. Alternatively, the integration process may be a process for calculating an average value of the respective gradients of the model parameters θ1 to θ10 transmitted from the respective sites S1 to S10 instead of the average value of the model parameters θ1 to θ10.

The update process performed by the integrated prediction model M100 is a process achieved in the following manner. The server 100 transmits the integrated prediction model M100 to the sites S1 to S10. The sites S1 to S10 input the pieces of learning data D1 to D10 to the integrated prediction model M100, respectively, perform learning, and transmit the model parameters θ1 to θ10 of the regenerated prediction models M1 to M10 to the server 100, respectively. The server 100 regenerates the integrated prediction model M100. When the generated integrated prediction model M100 achieves desired prediction accuracy, federated learning ends. In addition, federated learning may be ended on the basis of a predetermined number of times of update instead of the desired prediction accuracy.

<Non-Independent and Identical Distribution>

It is generally presupposed that data given to machine learning is independently and identically distributed (iid). For example, independent and identical distribution refers to such a distribution where independent results are obtained regardless of which throw is made and how many pips are shown on each dice when dices 1 to 6 are thrown a plurality of times on an assumption that a probability of a certain number of pips shown on each dice is uniform. A state where this definition does not hold is non-independent and identical distribution (non-iid).

Data under a non-iid condition is called data where data shift or data skew has been caused, or non-iid data. For example, it is predicted that data retained in hospitals located in Japan and data retained in hospitals located in the U.S. are considerably different from each other in distributions of body conditions, races, incomes, or the like of medical examinees due to a difference in insurance system between these countries. Such data is considered as non-iid data.

Non-iid data having such characteristic variations as described above is mainly classified into four types according to the manner of variations. Specifically, there are four types of classification, i.e., covariate shift (e.g., feature distribution skew), concept shift (e.g., same features, different features), label shift (e.g., target shift, label distribution skew, prior probability shift), and concept drift (e.g., same label, different label).

These types are defined on the basis of a difference in feature distribution, a difference in objective variable distribution, a difference in probability with these two conditions, or the like. The types of non-iid data are statistically defined, but a plurality of types are generated from actual data. Accordingly, it is difficult to evaluate which type of data is generated, and with which level of intensity each data is generated.

Even when a prediction model capable of achieving accurate prediction at the time of learning is applied to verification data in a case where data for learning and data for testing at one site are separated in such a manner as to constitute non-iid data, a similarly accurate prediction result is not acquirable due to a difference in distribution. In this case, appropriate accuracy verification of a prediction model is also difficult to achieve. Accordingly, conventionally adopted has been such a method which randomly samples data from common data to designate the sampled data as data for learning and for verification, for example.

It is highly probable that even data constituting iid data within one site becomes non-iid data for the other sites. When each of the sites has non-iid data, it is predicted that the model parameters θ1 to θ10 of the prediction models M1 to M10 appropriate for the respective sites considerably vary for each of the sites. Specifically, there is a high possibility that the model parameter of the integrated prediction model M100 does not converge to an appropriate value even after a plurality of times of update by the integration process.

For example, a method considered to be adoptable for determining whether or not data is non-iid data is to compare features of data distribution one by one. Moreover, it is possible to confirm that distribution of the learning data D1 of the site S1 is different from distribution of the learning data D2 of the site 2, on the basis of an obvious decrease in prediction accuracy from the accuracy at the time of generation of the prediction model M1 when the prediction model M1 generated using the learning data D1 of the site S1 is applied to the learning data D2 of the site S2. Further, it is possible to estimate that data distribution of the learning data D1 becomes more different from data distribution of the learning data D2 as prediction accuracy increases at the time of generation of a prediction model for determining whether or not data corresponds to the learning data D1 or D2 of the site S1 or S2.

However, transfer of the learning data D to the outside of the sites S is prohibited under an environment of federated learning. Accordingly, data distributions are difficult to directly compare between the sites S. It is therefore considered to adopt a method described in Patent Document 2, which identifies a site where desired prediction accuracy is difficult to achieve, after federated learning, and again executes federated learning at sites other than this site, for example. However, repetitive execution of federated learning is a redundant way of learning which requires relearning of data once learned over and over again. Hereinafter, specifically described will be a generation method for generating appropriate prediction models before federated learning according to characteristics of the learning data D of the respective sites S.

Hardware Configuration Example of Computer (Server 100, Sites S)

Figure 2:
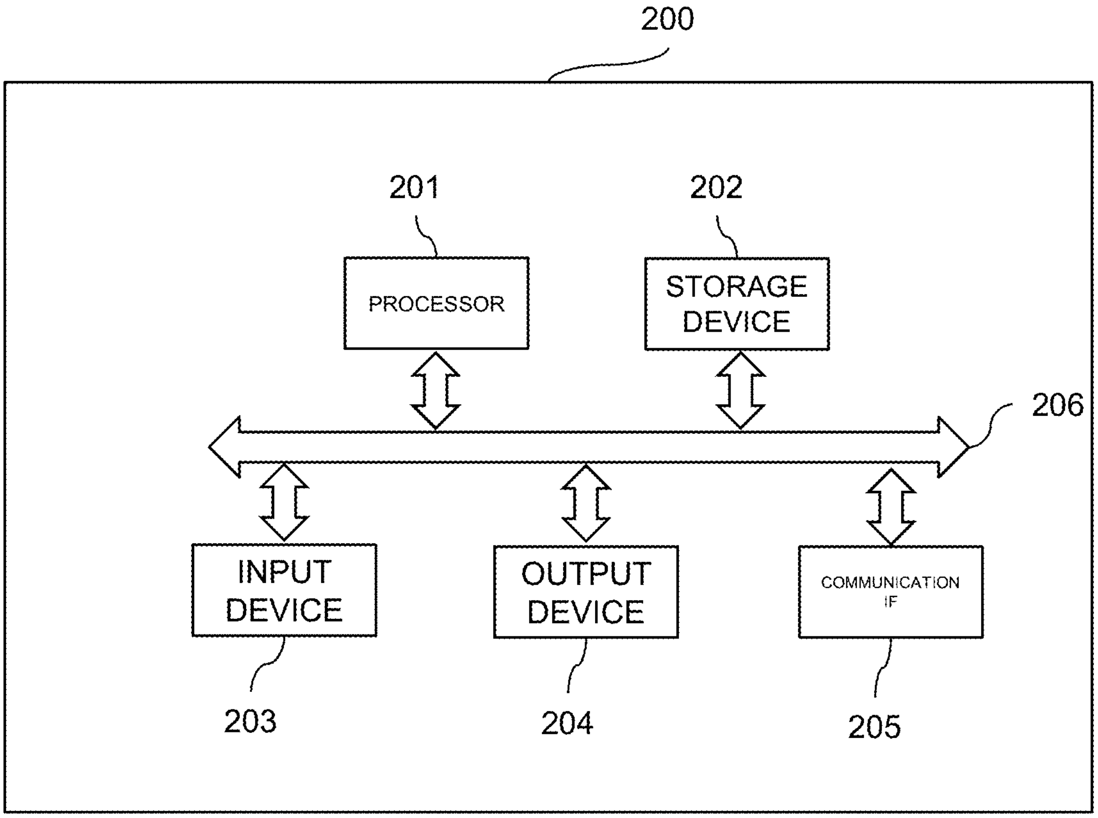
FIG. 2 is a block diagram depicting a hardware configuration example of a computer.

FIG. 2 is a block diagram depicting a hardware configuration example of a computer. The computer 200 includes a processor 201, a storage device 202, an input device 203, an output device 204, and a communication interface (communication IF) 205. The processor 201, the storage device 202, the input device 203, the output device 204, and the communication IF 205 are connected to one another via a bus 206. The processor 201 controls the computer 200. The storage device 202 is a work area for the processor 201. Moreover, the storage device 202 is a non-transitory or transitory recording medium for storing various programs and data. For example, the storage device 202 is a read only memory (ROM), a random access memory (RAM), a hard disk drive (HDD), or a flash memory. The input device 203 inputs data. For example, the input device 203 is a keyboard, a mouse, a touch panel, a numeric keypad, or a scanner. The output device 204 outputs data. For example, the output device 204 is a display or a printer. The communication IF 205 is connected to a network to transmit and receive data.

Functional Configuration Example of Computer 200

Figure 3:
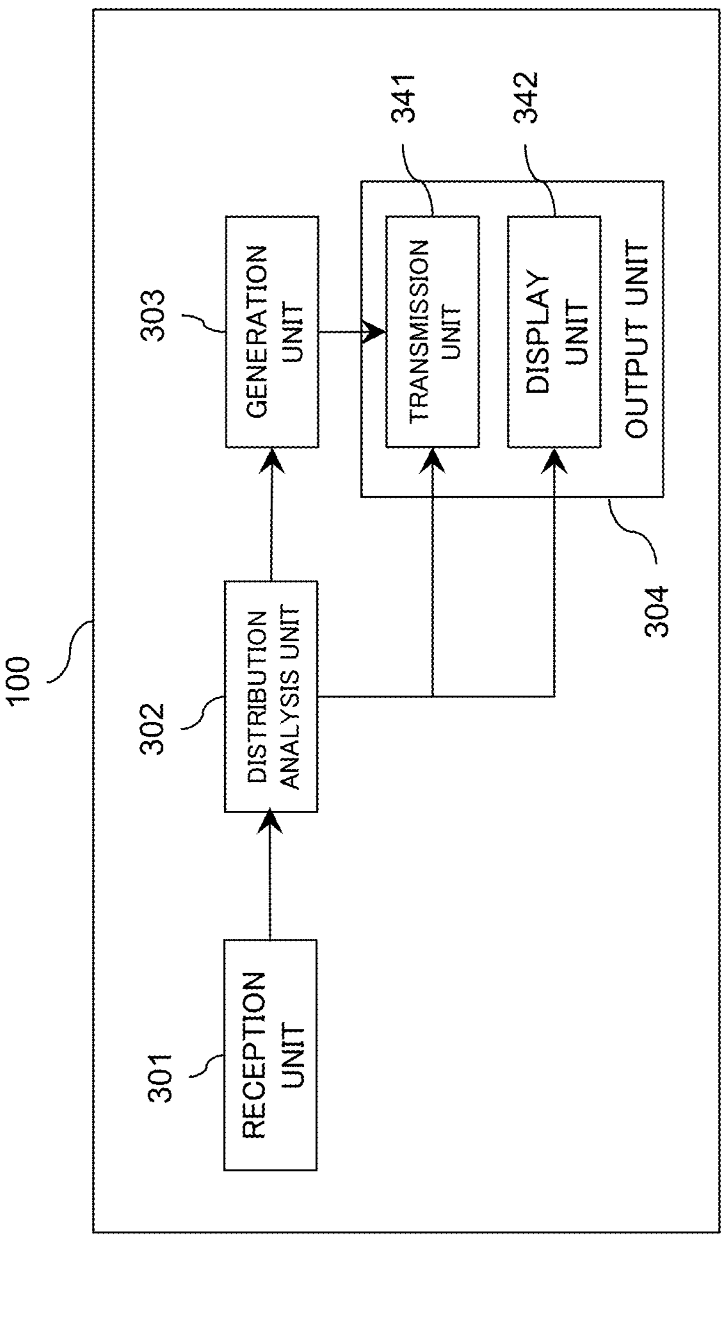
FIG. 3 is a block diagram depicting a functional configuration example of a server according to Embodiment 1.

FIG. 3 is a block diagram depicting a functional configuration example of the server 100 according to Embodiment 1. The server 100 includes a reception unit 301, a distribution analysis unit 302, a generation unit 303, and an output unit 304 (a transmission unit 341 and a display unit 342). Specifically, for example, the reception unit 301, the distribution analysis unit 302, the generation unit 303, and the output unit 304 each achieve a corresponding function by causing the processor 201 to execute a program stored in the storage device 202 depicted in FIG. 2, or by using the communication IF 205.

The reception unit 301 receives, via the communication IF 205, transformed features TF1 to TF10 (each simply referred to as a transformed feature TF if distinction between these features is unnecessary) of the sites S1 to S10, the model parameters θ1 to θ10 learned by the sites S1 to S10, and an accuracy verification result of the integrated prediction model M100. Each of the transformed features TF is transformed data obtained by transforming, in accordance with a rule set beforehand, a plurality of features as training data contained in the learning data D.

The distribution analysis unit 302 executes analysis of similarity between the pieces of learning data D by using the transformed features TF1 to TF10 received by the reception unit 301. There exist the ten sites S1 to S10 in the example depicted in FIG. 1. Accordingly, the distribution analysis unit 302 executes calculation of similarity between the pieces of learning data D for each of 45 combinations each constituted by the two sites S.

For example, a calculation method adoptable as a method for calculating similarity between the pieces of learning data D may be a method which performs dimension compression of Euclidean distances or cosine distances between the transformed features TF, indexes each indicating a distribution difference on the basis of Jensen-shannon divergence or the like, t-distributed stochastic neighbor embedding (t-SNE) or principal component analysis (PCA), or the like to transform dimension of vectors to three dimension or less, a hierarchical clustering method such as the Ward's method, or a non-hierarchical clustering method such as a K-Means method.

The generation unit 303 generates one or more prediction models on the basis of the model parameter θ1 of the prediction model M transmitted from the one or more sites S. Specifically, for example, the generation unit 303 generates the prediction model M on the basis of the corresponding model parameter θ1 for a cluster containing only the one site S (local learning method). Alternatively, the generation unit 303 operates the prediction model M only at the site S without transmitting the prediction model M to the server 100. Moreover, for a cluster containing a plurality of the sites S, the generation unit 303 executes an integration process for generating one or a plurality of integrated prediction models on the basis of the model parameters θ1 of these sites S.

The output unit 304 has the transmission unit 341 and the display unit 342.

The transmission unit 341 transmits, to the sites S1 to S10, the base prediction model M0 and a notification of execution of a learning method selected from a local learning method which generates the one prediction model M by using the learning data D of the single site S, an federated learning method which generates the one integrated prediction model M100 by using the learning data D of a plurality of the sites S, and a personalized federated learning method which generates one or more integrated prediction models by using the learning data D of a plurality of the sites S.

Note that personalized federated learning has various learning methods. For example, there is a learning method which generates one integrated prediction model on the basis of a plurality of the pieces of learning data D while putting emphasis on improvement of convergence of an integrated prediction model by smoothing of statistical non-uniformity between a plurality of pieces of the learning data D of a plurality of the sites S. There is also a learning method which generates a plurality of integrated prediction models on the basis of a plurality of prediction models while putting emphasis on improvement of performance of an integrated prediction model at any level such as the respective sites S and the clustered sites S.

Note that personalized federated learning is a learning method included in federated learning. Accordingly, federated learning other than personalized federated learning will be referred to as "non-personalized federated learning," and federated learning methods other than a personalized federated learning method will be referred to as a "non-personalized federated learning method."

Moreover, the transmission unit 341 transmits the integrated prediction model M100 generated by the generation unit 303 to the site S where the prediction model M used for generation of the integrated prediction model is generated. Further, the transmission unit 341 transmits a continuation instruction indicating whether to continue repetition of federated learning or end this repetition to each of the sites S, on the basis of an accuracy verification result executed at each of the sites S.

The display unit 342 displays data on a display which is an example of the output device 204. For example, the display unit 342 displays a distribution analysis result obtained by the distribution analysis unit 302.

Figure 4:
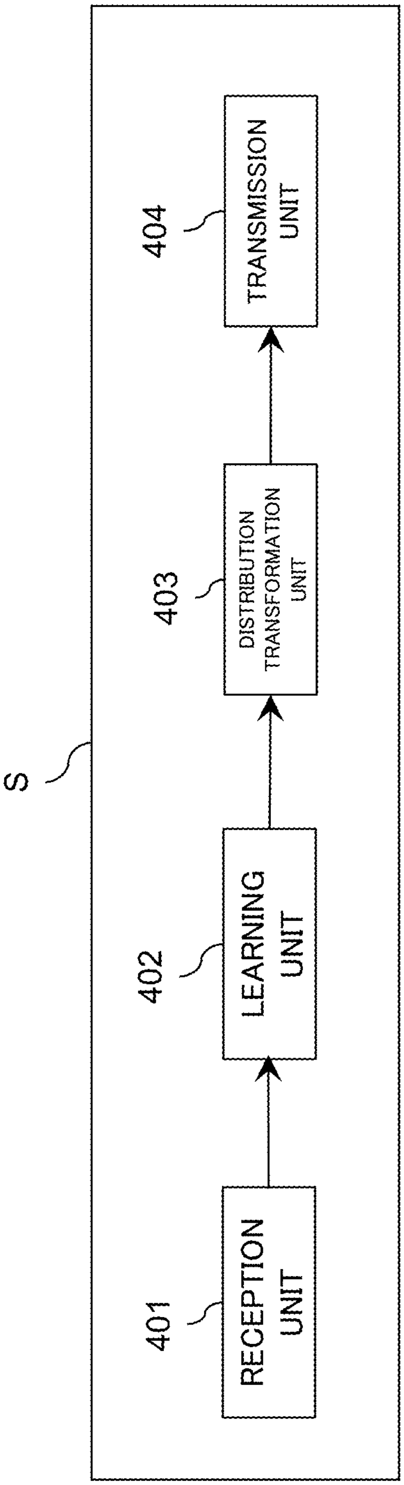
FIG. 4 is a block diagram depicting a functional configuration example of a site according to Embodiment 1.

FIG. 4 is a block diagram depicting a functional configuration example of each of the sites S according to Embodiment 1. Each of the sites S has a reception unit 401, a learning unit 402, a distribution transformation unit 403, and a transmission unit 404. Specifically, for example, the reception unit 401, the learning unit 402, the distribution transformation unit 403, and the transmission unit 404 each achieve a corresponding function by causing the processor 201 to execute a program stored in the storage device 202 depicted in FIG. 2, or by using the communication IF 205.

The reception unit 401 receives the base prediction model M0 and a notification of execution of a learning method selected from a local learning method which generates the one prediction model M at the single site S, a federated learning method which generates the one integrated prediction model M100 at a plurality of the sites S, and a personalized federated learning method which generates a plurality of integrated prediction models at a plurality of the sites S.

Moreover, after generation of the prediction model M, the reception unit 401 receives an integrated prediction model generated by the generation unit 303 during federated learning. Further, the reception unit 401 receives, from the server 100, a continuation instruction indicating whether to continue repetition of federated learning or end this repetition.

The learning unit 402 gives the learning data D to a prediction model constituted by a parameter determined by a random initial value or to the base prediction model M0, to generate the prediction model M. Specifically, for example, the learning unit 402 acquires the base prediction model M0 from the server 100, and gives the learning data D to the base prediction model M0. The learning data D1 is a combination of training data and ground truth data. Accordingly, the learning unit 402 generates the model parameter θ1 and the prediction model M by calculating a loss function for minimizing a sum of squared errors or a cross entropy error, on the basis of ground truth data and prediction data which is output as a result of input of training data to the base prediction model M0.

The prediction model M having learned a feature vector x corresponding to training data within the learning data D is represented by an output y as prediction data, the model parameter 19, and a function h as indicated by the following Formula (1). Moreover, the base prediction model M0 can be generated using the following Formula (1).

[Math. 1]

$$y=h(x;\theta) \quad (1)$$

The distribution transformation unit 403 transforms the learning data D at each of the sites S, and executes a transformation process for transforming data to data of being in such a state where no problem is caused after transfer to the outside of the corresponding site S, to generate the transformed feature TF. For example, when training data within the learning data D is constituted by 100 samples having five features, the distribution transformation unit 403 averages the samples in directions of the samples, transforms the samples to feature vectors each constituted by an average value for the corresponding one of the five features, and designates the feature vectors as the transformed feature TF. The transformed feature TF may be generated using a statistic such as a maximum value, a minimum value, and a variance instead of the average value.

Moreover, when training data is image data, the distribution transformation unit 403 may quantify a plurality of features of the image data in accordance with a transformation rule defined beforehand for image data, to transform the image data to feature vectors. If the image data is image data of an animal, for example, the plurality of features defined beforehand are constituted by the number of ears, the number of hands and feet, and the number of eyes of this animal. Such a transformation rule is retained in the server 100 and the sites S as a common rule.

The transmission unit 404 transmits the transformed feature TF generated by the distribution transformation unit 403, the model parameter 19, and an accuracy verification result of the integrated prediction model to the server 100.

Note that data transmitted and received by the reception units 301 and 401 and the transmission units 341 and 404 is transformed and protected by encryption or other methods from a viewpoint of security. This protection complicates analysis of data used for learning on the basis of the prediction model M.

<Analysis of Similarity Between Transformed Features TF by Distribution Analysis Unit 302>

Figure 5:
FIG. 5 is an explanatory diagram depicting Similarity Analysis Example 1 performed by a distribution analysis unit to analyze similarity between transformed features.

FIG. 5 is an explanatory diagram depicting Similarity Analysis Example 1 performed by the distribution analysis unit 302 to analyze similarity between the transformed features TF. FIG. 5 is an example where the server 100 analyzes similarity between the sites S1 to S10 by using Euclidean distances between the transformed features TF received from the respective sites S. According to a heat map 500 representing Euclidean distances, a distance decreases, i.e., similarity between distributions of the transformed features TF increases, as a color becomes darker.

According to this example, it is recognizable that distributions of the transformed features TF at the site S1, the site S3, the site S5, and the site S9 are similar to each other. It is also recognizable that distributions of the transformed features TF at the site S4 and the site S10 are similar to each other. It is further recognizable that distributions of the transformed features TF at the site S6 and the site S8 are similar to each other. On the basis of the similarity between the distributions of the transformed features TF, the server 100 determines the site S1, the site S3, the site S5, and the site S9 as a cluster exhibiting similar distributions of the transformed features TF, and determines the site S6 and the site S8 as a cluster exhibiting similar distributions of the transformed features TF, for example.

While FIG. 5 uses the heat map 500 for representation, i.e., expresses the distances using graduations of color, the distances may be represented by numerical values. These types of map information are examples of information associated with similarity between features of the sites S.

Figure 6:
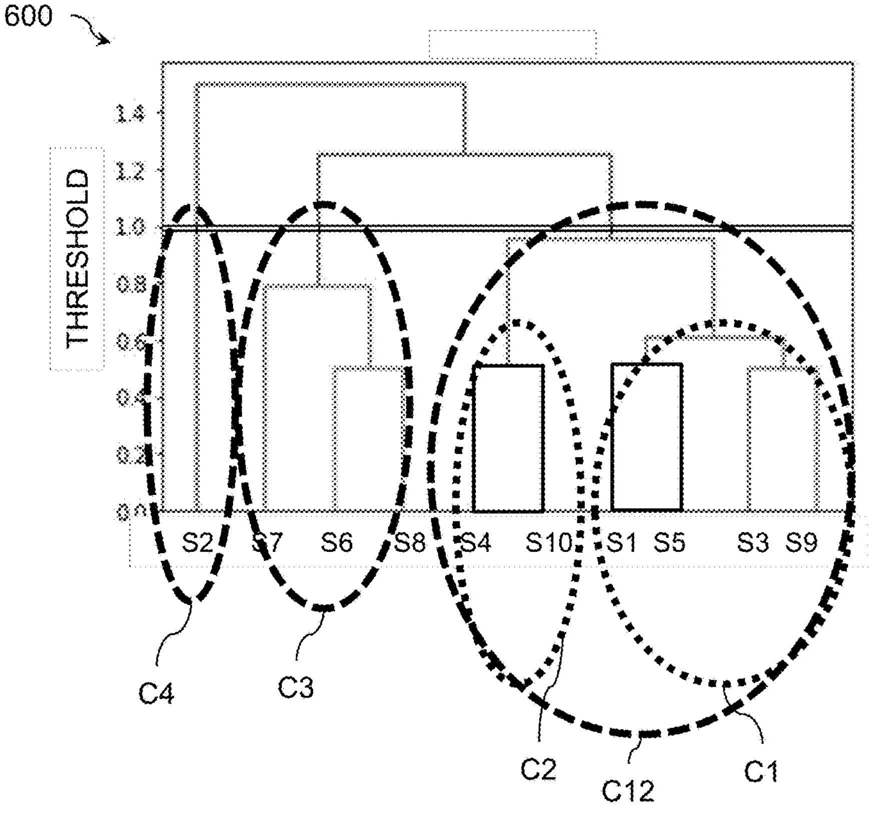
FIG. 6 is an explanatory diagram depicting Similarity Analysis Example 2 performed by the distribution analysis unit to analyze similarity between transformed features.

FIG. 6 is an explanatory diagram depicting Similarity Analysis Example 2 performed by the distribution analysis unit 302 to analyze similarity between the transformed features TF. FIG. 6 is an example where the server 100 analyzes similarity between the sites S1 to S10 by using hierarchical clustering of the transformed features TF received from the respective sites S.

A dendrogram 600 is generated on the basis of hierarchical clustering of the transformed features TF. A horizontal axis of the dendrogram 600 represents arrangement of the sites S according to the hierarchical clustering, while a vertical axis represents distances calculated from the transformed features TF. A method for calculating the distances varies according to a method for measuring distances between clusters in hierarchical clustering. The dendrogram 600 is also an example of information associated with similarity between features of the sites S.

According to the dendrogram 600, the site S1, the site S3, the site S5, and the site S9 are recognizable as sites belonging to an identical cluster from an early stage (cluster C1). The site S4 and the site S10 are also recognizable as sites belonging to an identical cluster from an early stage (cluster C2). The site S6 and the site S8 are also recognizable as sites belonging to an identical cluster from an early stage.

Moreover, according to the dendrogram 600, similarity between distributions of the pieces of learning data D of the site S6, the site S7, and the site S8 is recognizable as a cluster C3, and similarity between distributions of the pieces of learning data D of the site S1, the site S3, the site S4, the site S5, the site S9, and the site S10 is recognizable as a cluster C12, while the similarity is not easily recognizable from the heat map 500. In addition, a cluster constituted by only the site S2 is designated as a cluster C4.

Assuming herein that a threshold for similarity between distributions of the pieces of learning data D is 1.0, the ten sites S1 to S10 is dividable into the three clusters C12, C3, and C4. The cluster C4 containing only the one site S2 in the three clusters C12, C3, and C4 is considered to exhibit higher accuracy of a prediction model M2 generated by only the single site than accuracy of the integrated prediction model M100 generated by federated learning, on the basis of similarity between distributions of pieces of the learning data D. Application of federated learning is considered to be more preferable for the clusters C12 and C3 each containing the two or more sites S.

In this case, however, it is considered that an appropriate federated learning method is individually present according to similarity between the pieces of learning data D. The sites S6 to S8 constitute one cluster with a threshold of approximately 0.8 sufficiently below the threshold of 1.0. Accordingly, the prediction model M achieving high accuracy is considered to be generated by federated learning. Moreover, the six sites of the site S1, the sites S3 to S5, the site S9, and the site S10 constitute the one cluster C12, but can be divided into a cluster C1 containing the site S1, the site S3, the site S5, and the site S9 and the cluster C2 containing the site S4 and the site S10. When a considerable difference is produced in distribution of the learning data D as in this case, personalized federated learning included in federated learning is also considered to be applied.

The distribution analysis unit 302 selects, on the basis of a result of Euclidean distances and hierarchical clustering, any one of a local learning method which generates the one prediction model M at the single site S, a non-personalized federated learning method which generates the one integrated prediction model M100 from a plurality of the sites S, and a personalized federated learning method which generates a plurality of integrated prediction models from a plurality of the sites S.

For example, for selecting any one of the local learning method, the non-personalized federated learning method, and the personalized federated learning method, a user of the server 100 may refer to the heat map 500 and the dendrogram 600 displayed on a screen and then select any one of these methods, or may set a threshold beforehand and allow the distribution analysis unit 302 to select any one of these methods on the basis of this threshold.

For example, when the threshold is set to 1.0 in FIG. 6, the sites S1 to S10 are divided into the clusters C12, C3, and C4. In this case, only the one site S2 belongs to the cluster C4. Accordingly, the distribution analysis unit 302 determines the local learning method as a learning method for the site S2 within the cluster C4.

Moreover, the cluster C3 contains a plurality of the sites S6 to S8, and constitutes one cluster with a threshold of 0.8 sufficiently lower than the threshold of 1.0. Accordingly, the distribution analysis unit 302 determines the non-personalized federated learning method as a learning method for the sites S6 to S8 within the cluster C3.

Further, the cluster C12 contains a plurality of the sites S1, S3, S4, S5, S9, and S10. In addition, the cluster C12 has a plurality of clusters each containing a plurality of sites (clusters C1 and C2). The clusters C1 and C2 constitute one cluster near the threshold of 1.0, and therefore, a large difference is considered to be produced in distribution of the learning data D. Accordingly, the distribution analysis unit 302 determines the personalized federated learning method as a learning method for the sites S1, S3, S4, S5, S9, and S10 within the cluster C12.

In addition, the distribution analysis unit 302 may set a limiting condition other than the threshold to select the learning method. For example, when the number of clusters or the number of sites belonging to any one of the clusters reaches a number set beforehand by a change of the threshold, the distribution analysis unit 302 may stop this change of the threshold, and determine a learning method for the cluster at that time.

For example, the distribution analysis unit 302 sets an initial value of the threshold to a maximum value (e.g., 2.0) in the dendrogram 600, and decreases the threshold from the maximum value by a predetermined quantity (e.g., 0.1). Suppose that the limiting condition is "3" as a set number of clusters. When the threshold reaches 1.4, there exist two clusters which are the cluster C4 and a cluster constituted by the sites S1 and S3 to S10. In this case, the number of clusters is "2." Accordingly, the threshold continues to decrease. When the threshold reaches 1.2, there exist the clusters C12, C3, and C4. In this case, the number of clusters reaches "3." Accordingly, the threshold stops decreasing, and the distribution analysis unit 302 determines a learning method for each of the clusters C12, C3, and C4 at this time.

Suppose further that the limiting condition is "4 or smaller" as the number of sites within one cluster. When the threshold reaches 1.4, there exist two clusters which are the cluster C4 and a cluster constituted by the sites S1 and S3 to S10. In this case, the number of sites in the latter cluster is "9." The threshold continues to decrease. When the threshold reaches 1.2, there exist the clusters C3, C4, and C12.

The number of the sites belonging to the latter cluster in the clusters C3, C4, and C12 is "6." The threshold continues to decrease. When the threshold reaches 0.9, there exist the clusters C1, C2, C3, and C4. In this case, the number of clusters belonging to the cluster C1 is "4." Accordingly, the threshold stops decreasing, and the distribution analysis unit 302 determines a learning method for each of the clusters C1, C2, C3, and C4 at this time.

Note that the examples described above are presented only by way of example. The set number of clusters may be determined in various manners, such as "n" (n: 1 or larger integer), "n or more," "more than n," "n or less," and "less than n." Similarly, the number of sites within one cluster may be determined in various manners, such as "m" (m: one or larger integer), "m or more," "more than m," "m or less," and "less than m."

Further, while the example of the set number of clusters and the example of the number of sites within one cluster are separately described in the above example, the limiting condition may be constituted by both the set number of clusters and the number of sites within one cluster, such as a case where both "n" as the set number of clusters and "m" as the number of sites within one cluster are defined as the limiting condition. In addition, while the distribution analysis unit 302 decreases the threshold value from the maximum value in the example described above, the threshold may be increased from a minimum value (e.g., 0.0) by a predetermined quantity.

Learning Examples

Figure 7:
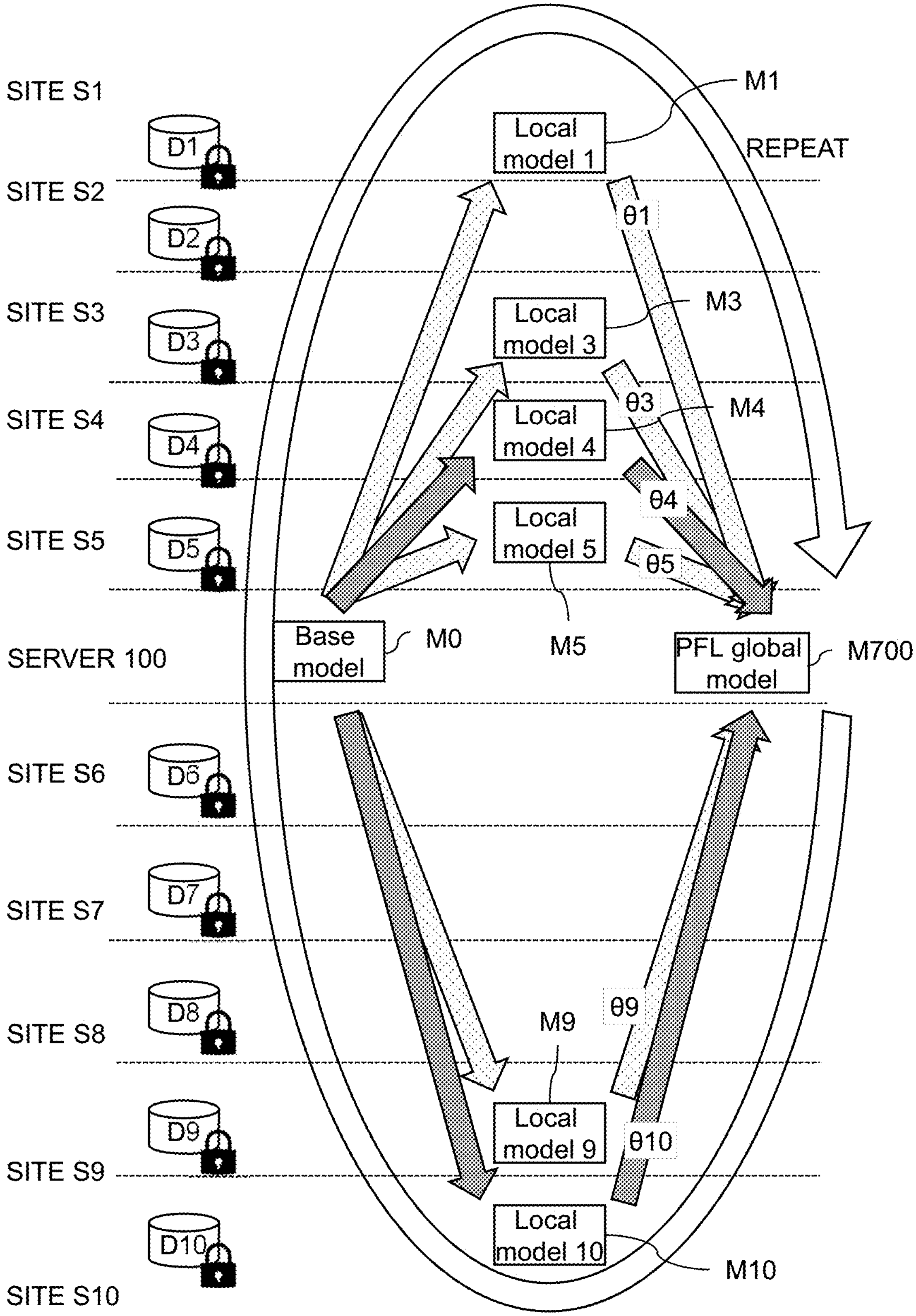
FIG. 7 is an explanatory diagram depicting Learning Example 1 performed by the server and sites.

FIG. 7 is an explanatory diagram depicting Learning Example 1 performed by the server 100 and the sites S. FIG. 7 depicts an example which executes personalized federated learning for generating one integrated prediction model M700 by using the pieces of learning data D1, D3 to D5, D9, and D10 of the cluster C1 constituted by the sites S1, S3, S5, and S9 and the cluster C2 constituted by the site S4 and the site S10 in a case where the cluster C12 is a target cluster for which a learning method is to be determined.

The reception units 401 of the sites S1, S3 to S5, S9, and S10 each receive, from the server 100, a notification that personalized federated learning has been selected. The learning units 402 of the sites S1, S3 to S5, S9, and S10 generate the prediction models M1, M3 to M5, M9, and M10 by using the pieces of learning data D1, D3 to D5, D9, and D10, respectively. Thereafter, the transmission units 404 of the sites S1, S3 to S5, S9, and S10 transmit the model parameters θ1, θ3 to θ5, θ9, and θ10 of the generated prediction models M1, M3 to M5, M9, and M10 to the server 100.

The reception unit 301 of the server 100 receives the model parameters θ1, θ3 to θ5, θ9, and θ10. The generation unit 303 of the server 100 executes the integration process by using the model parameters θ1, θ3 to θ5, θ, and θ10, to generate the integrated prediction model M700. The server 100 repeats an update process for updating the integrated prediction model M700 until the generated integrated prediction model M700 achieves desired prediction accuracy.

While FIG. 7 depicts the example which executes personalized federated learning for generating the one integrated prediction model M700 by using the pieces of learning data D1, D3 to D5, D9, and D10 of the cluster C1 and C2 in the case where the cluster C12 is the target cluster for which the learning method is to be determined, also executable is such personalized federated learning which generates one integrated prediction model by using the pieces of learning data D1, D3, D5, and D9 of the cluster C1 and generates one integrated prediction model by using the pieces of learning data D4 and D10 of the cluster C2.

Figure 8:
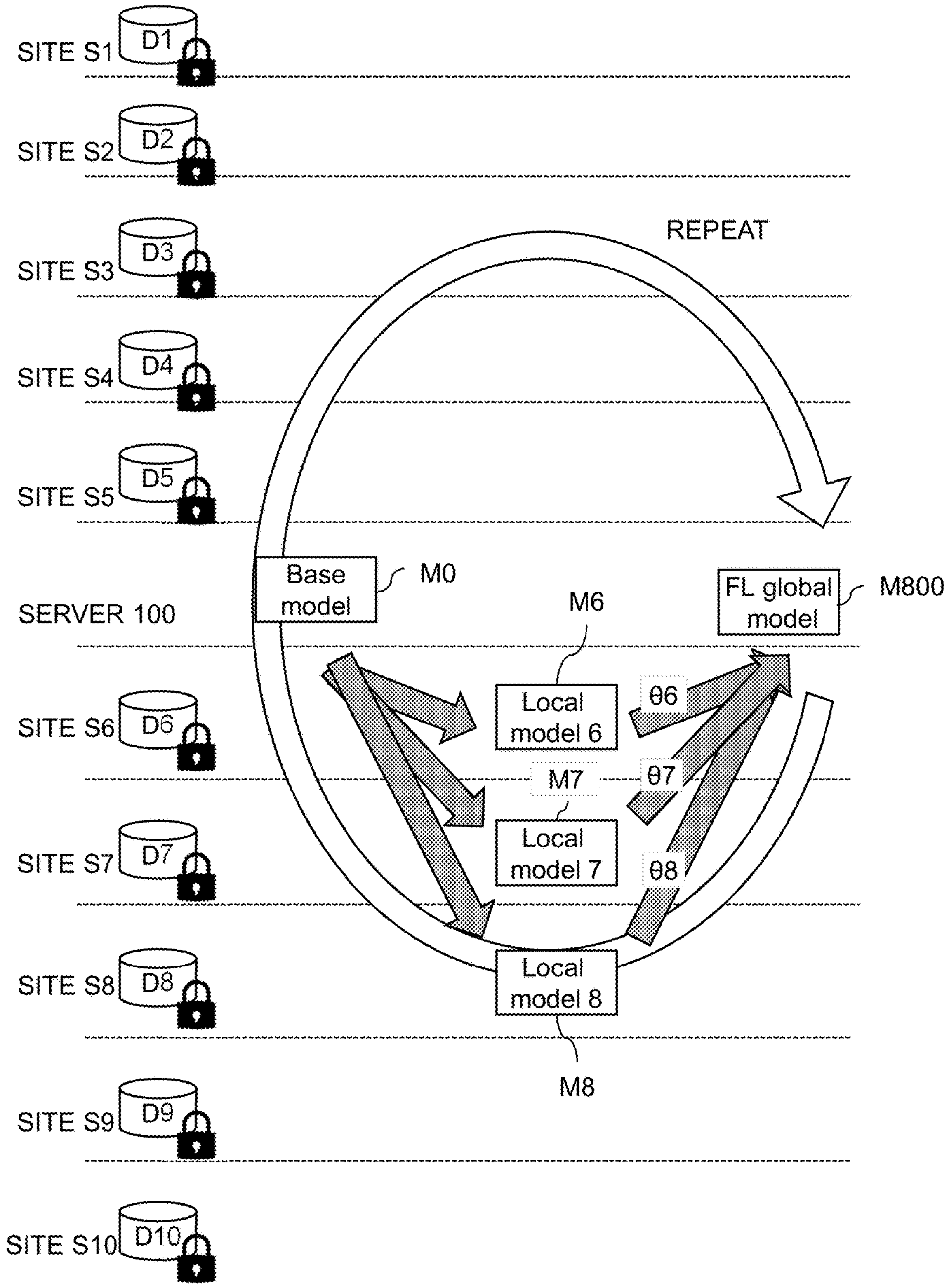
FIG. 8 is an explanatory diagram depicting Learning Example 2 performed by the server and the sites.

FIG. 8 is an explanatory diagram depicting Learning Example 2 performed by the server 100 and the sites S. FIG. 8 depicts an example which executes non-personalized federated learning for generating one integrated prediction model by using the learning data D6 to 8 of the cluster C3 constituted by the sites S6 to S8 in a case where the cluster C3 is a target cluster for which a learning method is to be determined.

The reception units 401 of the sites S6 to S8 each receive, from the server 100, a notification that non-personalized federated learning has been selected. The learning units 402 of the sites S6 to S8 generate the prediction models M6 to M8 by using the pieces of learning data D6 to D8, respectively. Thereafter, the transmission units 404 of the sites S6 to S8 transmit the generated prediction models M6 to M8 to the server 100.

The reception unit 301 of the server 100 receives the model parameters θ6 to θ8 of the prediction models M6 to M8. The generation unit 303 of the server 100 executes the integration process by using the model parameters θ6 to θ8, to generate an integrated prediction model M800. The server 100 repeats an update process for updating the integrated prediction model M800 until the generated integrated prediction model M800 achieves desired prediction accuracy.

While described with reference to FIGS. 7 and 8 have been the examples where the server 100 determines the learning method with reference to the dendrogram 600 and generates the prediction models M or the integrated prediction models, the server 100 may determine the learning method by clustering the plurality of sites S with reference to the heat map 500 and generate the prediction models M or the integrated prediction models.

<Integration Process for Prediction Model M>

Next, the integration process performed by the generation unit 303 to integrate the prediction models M will be specifically described. In the integration process for integrating the prediction models M, learning is performed at each of the K (K: 1 or larger integer) sites S by using the corresponding data D on the basis of an initial value corresponding to the integrated prediction model M100 which is generated by applying a model parameter et (t: the number of times of update of the integrated prediction model M100) to the base prediction model M0.

Thereafter, the generation unit 303 acquires gradients g k associated with model parameters $\theta_k$ of the K prediction models M generated by the K sites S, and generates a model parameter $\theta^{t+1}$ of the integrated prediction model M100 corresponding to the (t+1)th update by using a sum of averages of the gradients g k as presented in the following Formula (2). In this expression, N is a total number of samples of all pieces of learning data D used by the K sites S for learning, and $N_k$ is the number of samples of the learning data D at the site k.

[Math. 2]

$$\theta^{t+1} \leftarrow \theta^t - \sum_{k=1}^{K} \frac{N_k}{N} g_k^t \tag{2}$$

In Formula (2) presented above, the gradients g k associated with the model parameters $\theta_k$ are used. This is a method used in consideration of security to prevent the learning data D from being analyzed on the basis of the model parameters $\theta_k$. Methods such as use of the model parameters $\theta_k$, encoding, and encryption may be employed instead of this method. Moreover, the generation unit 303 may integrate the prediction models M1 to M10 by a method different from Formula (2) presented above, according to a structure of the prediction models, such as a fully-connected layer and a convolutional layer.

For example, as presented in the following Formula (3), an average value normalized by the number of samples of the learning data D used for learning of the respective model parameters $\theta_k$ may be adopted, or the model parameters $\theta_k$ or the gradients g k of these parameters per batch or epoch in a learning process of the prediction models M may be employed.

[Math. 3]

$$\theta^{t+1} = \sum_{k=1}^{K} \frac{N_k}{N} \theta_k^t \tag{3}$$

<Integrated Learning Preprocessing Performed by Server 100>

Figure 9:
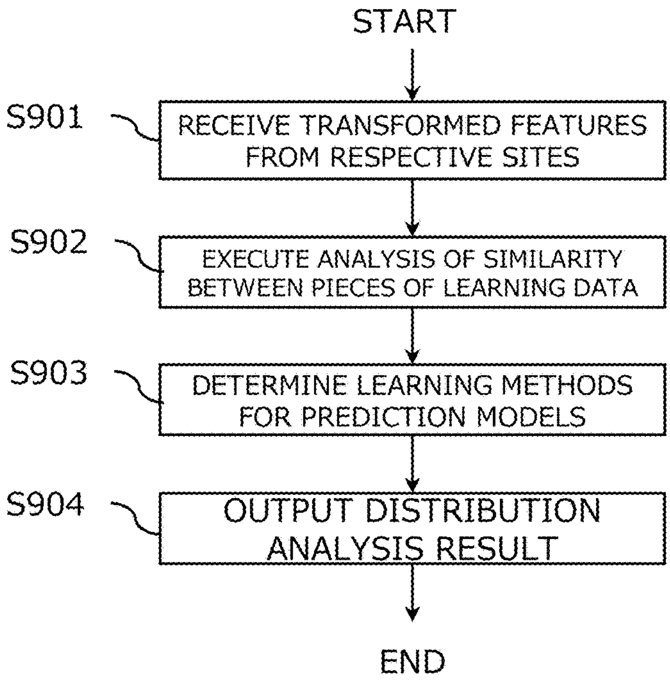
FIG. 9 is a flowchart illustrating an example of integrated learning preprocessing procedures performed by the server.

FIG. 9 is a flowchart illustrating an example of integrated learning preprocessing procedures performed by the server 100. It is assumed that the server 100 is enabled to communicate with the sites S that desire to join federated learning. The reception unit 301 of the server 100 receives the transformed features TF from the respective sites S (step S901). Next, the distribution analysis unit 302 of the server 100 executes analysis of similarity between the pieces of learning data D by using the received transformed features TF (step S902).

Then, the distribution analysis unit 302 of the server 100 determines a learning method for each of the sites S on the basis of similarity between distributions of the pieces of learning data D as depicted in FIGS. 5 and 6 (step S903). Thereafter, the output unit 304 of the server 100 outputs a distribution analysis result obtained by the distribution analysis unit 302 (step S904).

Specifically, for example, the display unit 342 of the server 100 displays the heat map 500, the dendrogram 600, and the learning methods of the federated prediction models M determined in step S903, i.e., the generation method of the integrated prediction model M100 and the learning methods of the prediction model M, as the distribution analysis result. Moreover, the transmission unit 341 of the server 100 notifies the respective sites S of the learning methods determined in step S903. In this manner, the integrated learning preprocessing is completed.

<Learning Preprocessing by Sites S>

Figure 10:
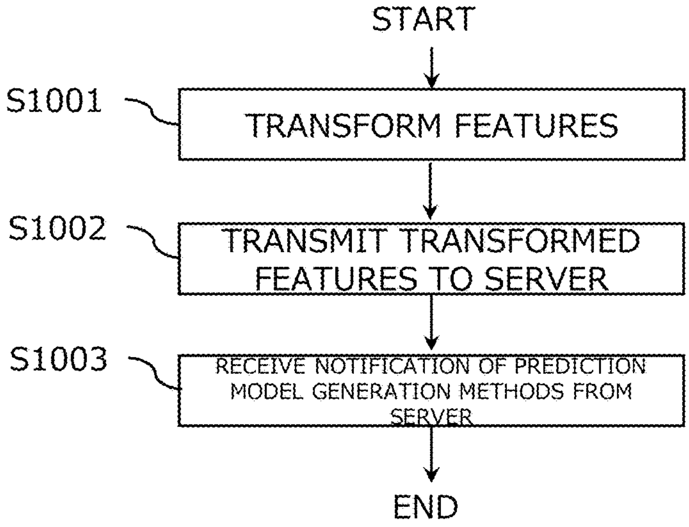
FIG. 10 is a flowchart illustrating an example of learning preprocessing procedures performed by the sites.

FIG. 10 is a flowchart illustrating an example of learning preprocessing procedures performed by the sites S. It is assumed that each of the sites S has already acquired, from the server 100, a method for transforming a feature corresponding to training data within the learning data D and a tool.

Each of the sites S transforms the feature corresponding to the training data within the learning data D by using the feature transforming method and the tool, to generate the transformed feature TF (step S1001). Next, each of the sites S transmits the transformed feature TF to the server 100 (step S1002). Thereafter, each of the sites S receives, from the server 100, the notification issued in step S904 (step S1003). In this manner, the learning preprocessing is completed.

According to the data analysis processing system described above, therefore, a learning method of the prediction model appropriate for the corresponding site S can be determined for each of the various pieces of learning data D1 to D10 of the respective sites S without a necessity of transfer of the pieces of learning data D1 to D10 retained at the plurality of sites S1 to S10 to the outside of the sites S. Accordingly, the prediction models M each appropriate for the corresponding site S or the integrated prediction models M100, M700, or M800 can be generated.

Display Screen Example

Described next will be a display screen example presented on a display as an example of the output device 204 of the computer 200.

Figure 11:
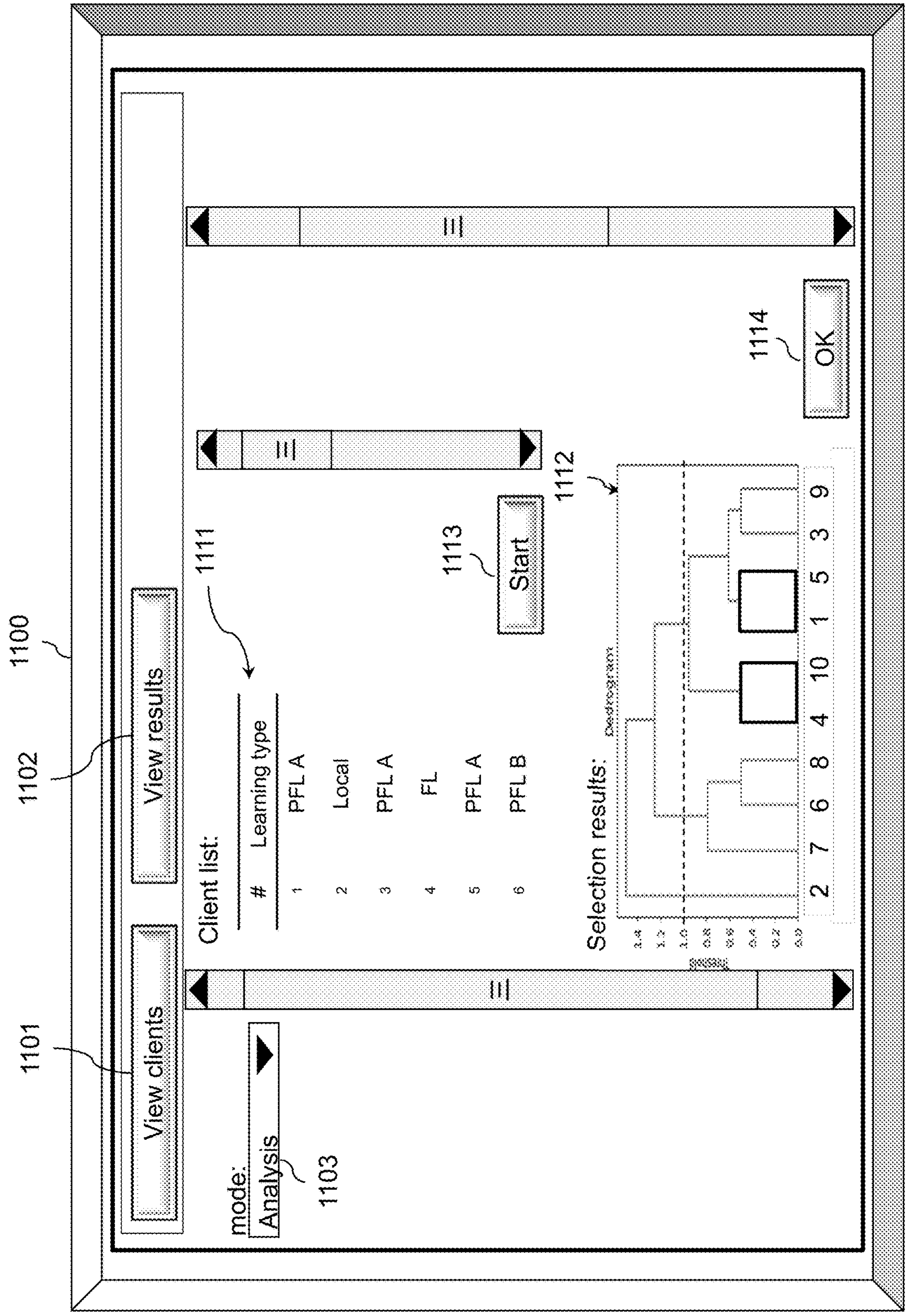
FIG. 11 is an explanatory diagram depicting Display Example 1 on a display screen.

FIG. 11 is an explanatory diagram depicting Display Example 1 of the display screen. For example, a display screen 1100 is presented on a display of the server 100. The display screen 1100 includes a view clients button 1101, a view results button 1102, a mode column 1103, a site list 1111, a site analysis result 1112, a site classification start button 1113, and a site classification result check button 1114.

In response to operation by the user, the server 100 receives selection of "Analysis" via the mode column 1103, and receives a press of the view clients button 1101. According to reception of these, the server 100 displays, on the site list 1111, the site list 1111 indicating sites desiring to join federated learning. When receiving a press of the site classification start button 1113 in response to operation by the user, the server 100 transmits a method necessary for generating a transformed feature and a tool to each of the sites S.

Transformed features are generated at the respective sites S, and are transmitted to the server 100. The distribution transformation unit 403 of the server 100 executes analysis of the received transformed features. Thereafter, when receiving a press of the view results button 1102 in response to operation by the user, the server 100 displays the site analysis result 1112. At this time, allocation of the learning methods to the respective sites S is simultaneously reflected in the site list 1111.

When the server 100 receives a press of the site classification result check button 1114 from the user having checked the site list 1111 and the site analysis result 1112, the server 100 transmits a notification of the allocated learning method to each of the sites S. Note herein that the learning methods of the respective sites S on the site list 1111 may be individually and directly edited by operation of the user.

Figure 12:
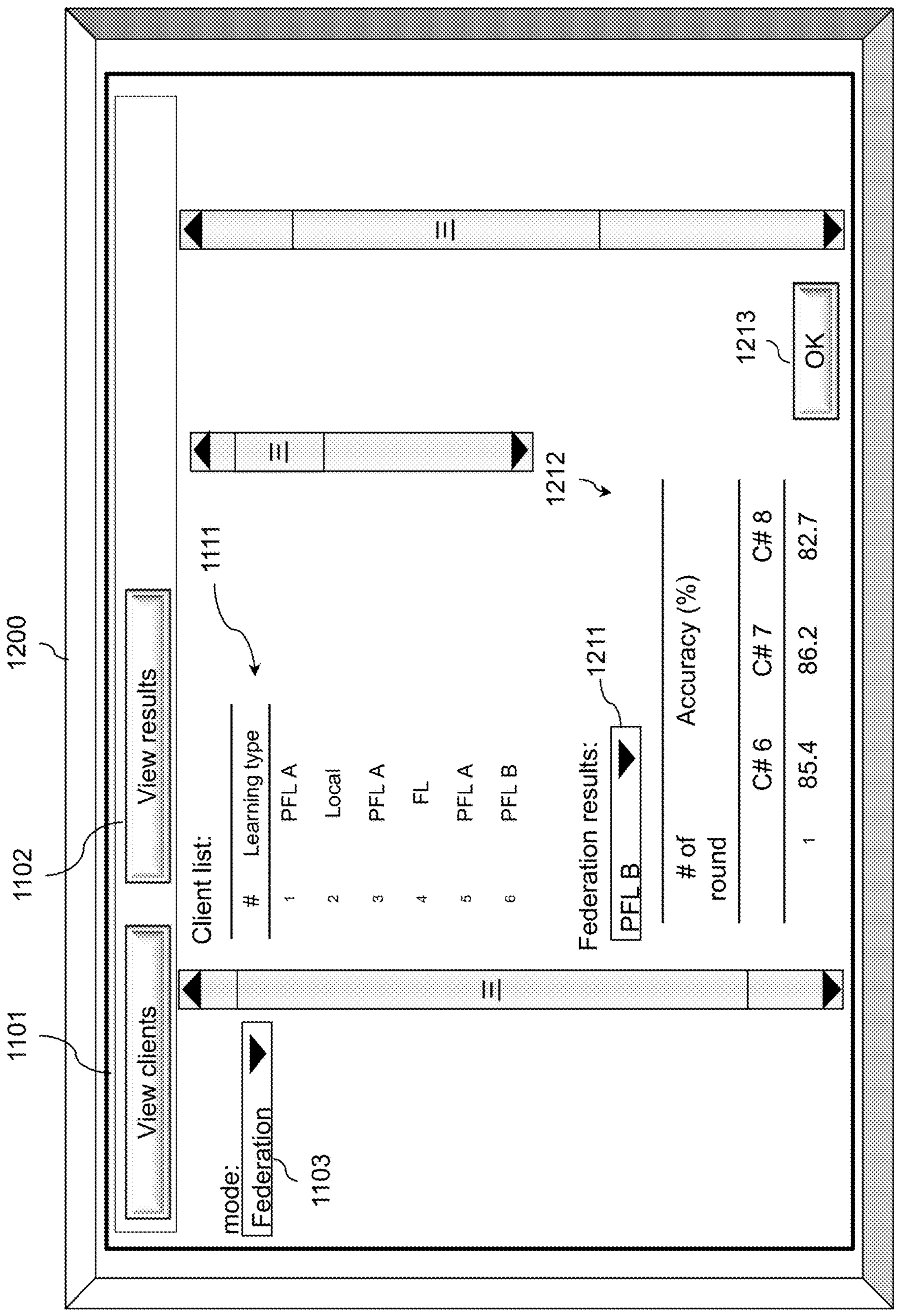
FIG. 12 is an explanatory diagram depicting Display Example 2 on the display screen.

FIG. 12 is an explanatory diagram depicting Display Example 2 on the display screen. For example, a display screen 1200 is presented on the display of the server 100. The display screen 1200 includes the view clients button 1101, the view results button 1102, the mode column 1103, the site list 1111, a group selection column 1211, a federated learning result 1212, and a federated learning result check button 1213.

In response to operation by the user, the server 100 receives selection of "Federation" via the mode column 1103 and a press of the view results button 1102. According to reception of these, the server 100 displays the federated learning result 1212. In addition, the server 100 receives selection of a learning group via the group selection column 1211 in response to operation by the user. According to reception of this selection, the server 100 displays the federated learning result 1212 of the sites S belonging to the learning group displayed on the site list 1111. When repetitive processing of federated learning is completed by execution of this processing a designated number of times or achievement of desire prediction accuracy, the server 100 ends the federated learning process when receiving a press of the federated learning result check button 1213 in response to operation by the user. When reselection of the sites or relearning is desired as a consequence of reception of the federated learning result, the display of the mode column 1103 may be switched to "Analysis," and returned to the display screen 1100 to again generate the transformed feature TF, determine the learning method, and perform federated learning.

According to Embodiment 1, therefore, the integrated prediction model M100 appropriate for each of the sites S can be generated for the various pieces of learning data D of the respective sites S without a necessity of transfer of the learning data D retained at the plurality of sites S to the outside of the sites S. In addition, while the number of the sites is set to ten in Embodiment 1, this number may be nine or smaller or 11 or larger as long as at least two sites are provided.

Embodiment 2

Embodiment 2 will be described. According to Embodiment 1, appropriate learning methods for the respective sites S are determined by analyzing transformed features of the respective sites S. Embodiment 2 is an example where the distribution analysis unit 302 determines appropriate learning methods for the respective sites S by using federated learning. Note that an integrated prediction model described in Embodiment 2 is not an integrated prediction model generated by the generation unit 303 of Embodiment 1, but an integrated prediction model for determining learning methods. Differences from Embodiment 1 will mainly be described in Embodiment 2, and points in common to Embodiment 1 will not be described.

For example, when each of the learning data D of the respective sites S is a stage classification of cancer patients at a corresponding hospital, output of an integrated prediction model to be finally generated is also a stage classification. When appropriate learning methods for the respective sites S are determined by federated learning in Embodiment 2, output of an integrated prediction model to be finally generated indicates at which site S the learning data D is retained (i.e., the site S to which the learning data D belongs).

Figure 13:
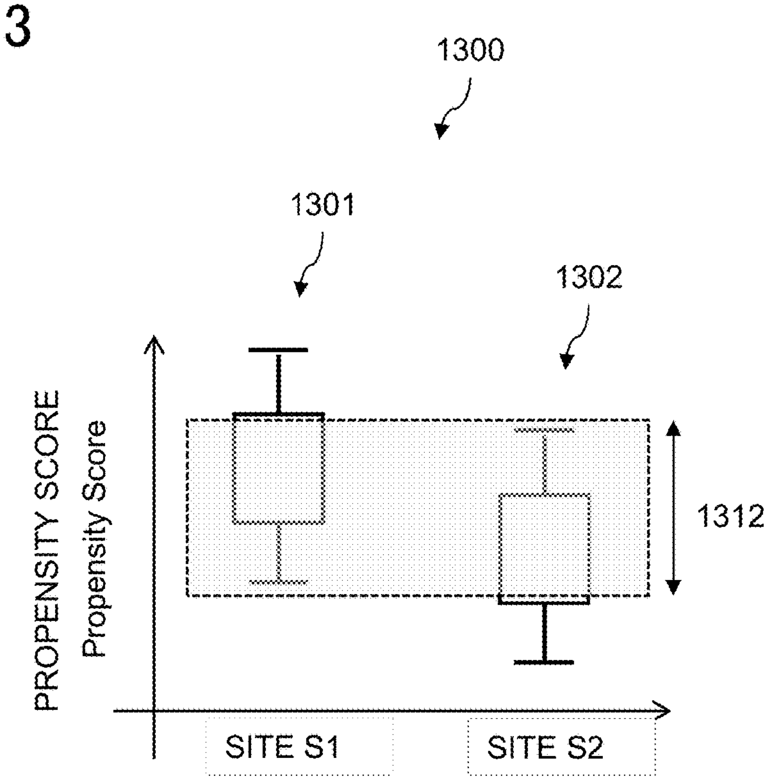
FIG. 13 is an explanatory diagram depicting Federated Learning Method 1 for achieving appropriate individual learning for a plurality of sites from which learning data is not allowed to be transferred to the outside.

FIG. 13 is an explanatory diagram depicting Federated Learning Method 1 for achieving individual learning appropriate for a plurality of the sites S from which the learning data D is not allowed to be transferred to the outside. When the plurality of sites S are constituted by only S1 and S2, the site S1 generates an identifier as the prediction model M1 by using the base prediction model M0 and the learning data D1, and transmits the model parameter θ1 of this identifier to the server 100. Similarly, the site S2 generates an identifier as the prediction model M2 by using the base prediction model M0 and the learning data D2, and transmits the model parameter θ2 of this identifier to the server 100. The server 100 generates a two-class classification identifier (hereinafter referred to as an integrated classification identifier) as the integrated prediction model M100 by using federated learning, on the basis of the model parameters θ1 and θ2 of the prediction models M1 and M2 generated by designating a class which has the learning data D of the site S1 as 0 and a class which has the learning data D of the site S2 as 1.

Each of the sites S1 and S2 receives the generated integrated identifier (integrated prediction model M100 as two-class classification identifier) from the server 100, and applies the received integrated identifier to calculate a predicted probability. Each of the sites S1 and S2 transmits, to the server 100, the calculated predicted probability or a value obtained by transforming the predicted probability to a propensity score, as a transformed feature. The example depicted in FIG. 13 uses a propensity score.

As illustrated in a graph 1300 in FIG. 13, the server 100 compares a box plot 1301 of the propensity score of the site S1 with a box plot 1302 of the propensity score of the site S2. For example, when a probability of the site S1 is high at the site S1 and low at the site S2, this state indicates that the pieces of learning data D1 and D2 of the two sites S1 and S2 are easily distinguishable, i.e., similarity between data distributions of these pieces of data is low. In this case, an overlapping range 1312 between the box plots 1301 and 1302 is narrow, or contains a small number of samples.

On the contrary, when the probability of the site S1 at the site S1 is equivalent to the probability of the site S1 at the site S2, this state indicates that the pieces of learning data D1 and D2 of the two sites S1 and S2 are difficult to distinguish from each other, i.e., similarity between data distributions of these pieces of data is high. In this case, the overlapping range 1312 between the box plots 1301 and 1302 is wide, or contains a large number of samples. The server 100 can evaluate similarity between the pieces of learning data D1 and D2 of both the sites S1 and S2 by comparing distributions of predicted probabilities obtained at the sites S1 and S2 at the time of application of the site classification integrated prediction model to these sites.

The propensity score herein is a statistical method or a value obtained by a statistical method for balance adjustment adopted to adjust covariates and estimate causal effects in an observational study where various types of confounding are easily caused in a difficult state of random allocation. According to Embodiment 2, in characteristic analysis of the learning data D of the respective sites S, the predicted probability may be used without change, or inverse probability weighting (IPW) estimator, a doubly robust estimator, or the like, which is a weighting method using a propensity score, may be adopted.

In the example depicted in FIG. 13, the server 100 determines similarity between the pieces of learning data D1 and D2 on the basis of a size of the overlapping range 1312 between the box plots 1301 and 1302. For example, if the overlapping range 1312 has a threshold value or larger, the server 100 determines that data distributions of the pieces of learning data D1 and D2 are similar. When it is determined that these pieces of data are similar, the server 100 designates the sites S1 and S2 as sites belonging to an identical cluster. Alternatively, similarity between the pieces of learning data D1 and D2 may be determined on the basis of the number of samples contained in the overlapping range 1312 instead of the size of the overlapping range 1312.

Moreover, while FIG. 13 depicts the example where the two sites are provided, the learning data D of the other sites S can more easily be estimated by the server 100 on the basis of the model parameter of the integrated prediction model as the number of sites decreases. Accordingly, actions such as prohibition of notification of the number of joining sites to the sites S, limitation of use to a case where the number of joining sites is a certain number or more, and use of a privacy protection method such as differential privacy stochastic gradient descent (DPSGD) and private aggregation of teacher ensembles (PATE) are preferably taken.

Figure 14:
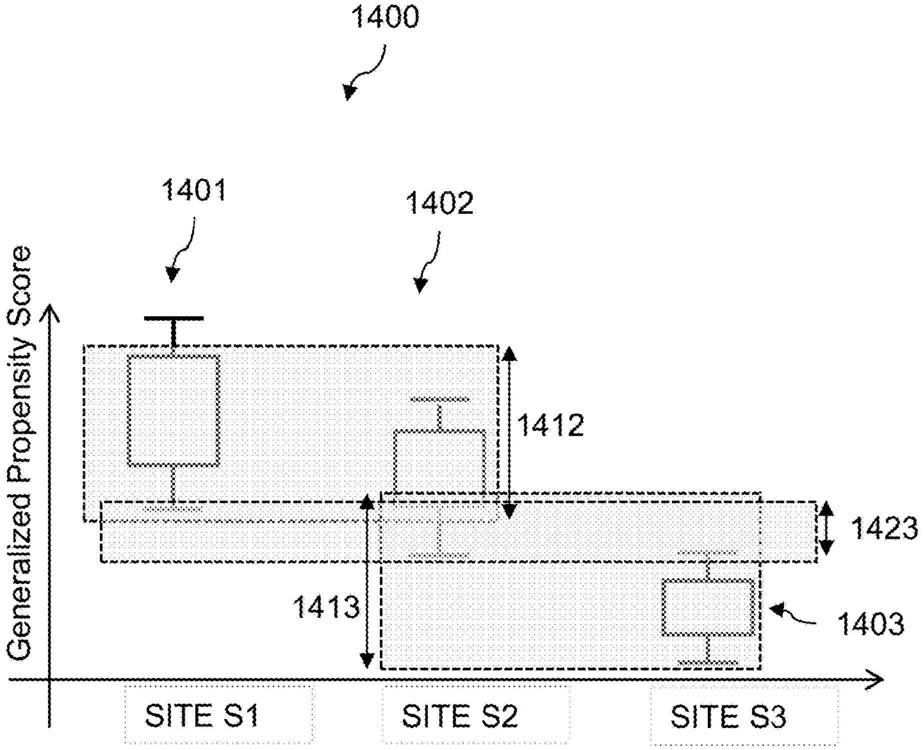
FIG. 14 is an explanatory diagram depicting Federated Learning Method 2 for achieving appropriate individual learning for a plurality of sites from which learning data is not allowed to be transferred to the outside.

FIG. 14 is an explanatory diagram depicting Federated Learning Method 2 for achieving individual learning appropriate for a plurality of the sites S from which the learning data D is not allowed to be transferred to the outside. FIG. 14 is a graph 1400 particularly indicating a case where three or more sites are provided. When the plurality of sites S are constituted by the sites S1, S2, and S3, the site S1 generates an identifier as the prediction model M1 by using the base prediction model M0 and the learning data D1, and transmits the model parameter θ1 of this identifier to the server 100. Similarly, the site S2 generates an identifier as the prediction model M2 by using the base prediction model M0 and the learning data D2, and transmits the model parameter θ2 of this identifier to the server 100. Similarly, the site S3 generates an identifier as the prediction model M3 by using the base prediction model M0 and the learning data D3, and transmits the model parameter θ3 of this identifier to the server 100.

The server 100 generates a three-class classification identifier (integrated classification identifier) as the integrated prediction model M100 by using federated learning, on the basis of the model parameters θ1 to θ3 of the prediction models M1 to M3 generated by designating a class which has the learning data D of the site S1 as 0, a class which has the learning data D of the site S2 as 1, and a class which has the learning data D of the site S3 as 2. Generally, a propensity score is a method used when two groups are separately provided. When three or more groups are provided, a generalized propensity score is used.

As presented in the following Formula (4), a generalized propensity score for the K different learning data D of the K sites S can be expressed using a propensity score PS(k|x) at a site k corresponding to the kth site S within the K sites S. It is designed in the following Formula (4) that the sum of K generalized propensity scores becomes 1.

[Math. 4]

$$GPS(k, x) = \frac{PS(k \mid x)}{1 + \sum_{s=1}^{K-1} PS(s \mid x)}, \qquad (4)$$

$$GPS(K, x) = \frac{1}{1 + \sum_{s=1}^{K-1} PS(s \mid x)}$$

According to the example depicted in FIG. 14, the server 100 determines similarity between the pieces of learning data D1 and D2 on the basis of a size of an overlapping range 1412 of box plots 1401 and 1402, determines similarity between the pieces of learning data D2 and D3 on the basis of a size of an overlapping range 1423 of the box plot 1402 and a box plot 1403, and determines similarity between the pieces of learning data D1 and D3 on the basis of a size of an overlapping range 1413 of the box plots 1401 and 1403.

For example, if the overlapping range 1412 has a threshold value or larger, the server 100 determines that data distributions of the pieces of learning data D1 and D2 are similar. When it is determined that these pieces of data are similar, the server 100 designates the sites S1 and S2 as sites belonging to an identical cluster. Determination is made in a similar manner on the other overlapping ranges 1423 and 1413. In addition, similarly to Federated Learning Method 1, similarity between the pieces of learning data D1 to D3 may be determined on the basis of the number of samples contained in each of the overlapping ranges 1412, 1423, and 1413, for example, instead of the sizes of the overlapping ranges 1412, 1423, and 1413.

According to the present embodiment, propensity scores calculated using two-class and three-class classification identifiers generated by federated learning beforehand are employed. When two-class and three-class classification identifiers are generated using federated learning, each of the sites S generates the prediction model M by using the learning data D. In this case, the prediction model M easily produce local solutions because each of the sites S generates the prediction model M by using only the own learning data D. When the server 100 performs the integration process for the model parameters θ1 of the prediction models M capable of predicting only the learning data D, the model parameter of the integrated prediction model changes in a direction of divergence from the learning data D retained at the sites S joining federated learning. In other words, an integrated prediction model exhibiting low prediction accuracy is generated.

For avoiding this problem, the server 100 first executes an integrated prediction model generation process of federated learning as output of an integrated prediction model to be finally generated (e.g., stage of cancer). Note that this process may be executed in a state of completion of an insufficient number of times of update. Next, the server 100 generates a class classification identifier by using federated learning while designating the model parameter θ1 in an intermediate layer of the generated integrated prediction model as an invariable parameter and designating output of the base prediction model M0 as the number of the sites S. By performing federated learning based on such transfer learning, output from the intermediate layer from which characteristics of the learning data D of the respective sites S are extractable becomes available, and generation of local solutions is avoidable even in a state where only the learning data D of the one site S is contained at the time of generation of the prediction model M at each of the sites S.

According to Embodiment 2, therefore, similarity between the pieces of learning data D of the sites S can be evaluated by comparing distributions of calculated generalized propensity scores.

Embodiment 3

Embodiment 3 will be described. Embodiment 3 is an example where the server 100 and the sites S in Embodiment 1 and Embodiment 2 have a common device configuration. Differences from Embodiment 1 and Embodiment 2 will mainly be described in Embodiment 3, and therefore, points in common to Embodiment 1 and Embodiment 2 will not be described.

Figure 15:
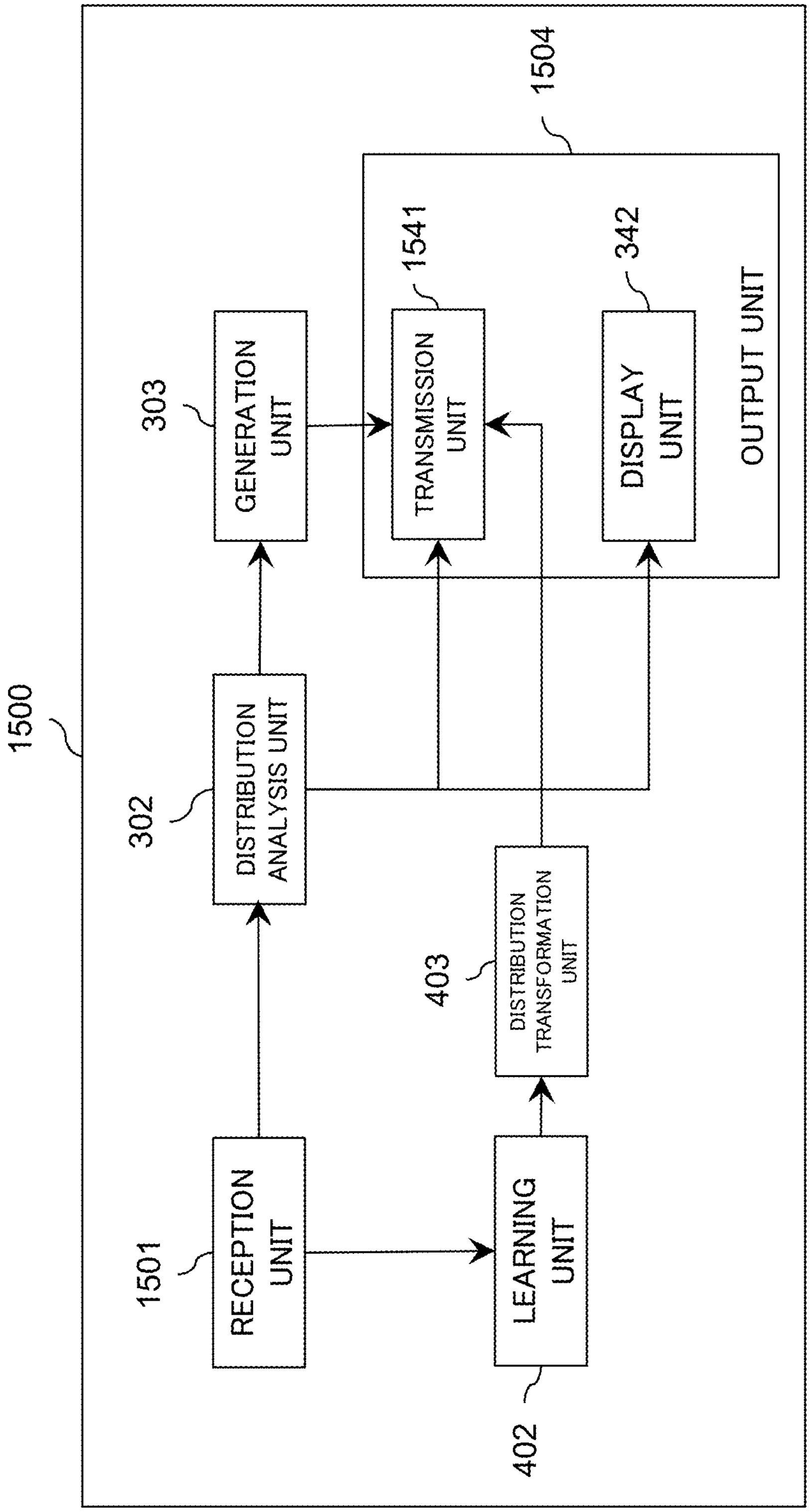
FIG. 15 is a block diagram depicting a functional configuration example of a calculator.

FIG. 15 is a block diagram depicting a functional configuration example of a calculator 1500 functioning as at least either the server 100 or each of the sites S. The calculator 1500 functioning as at least either the server 100 or each of the sites S includes a reception unit 1501, the distribution analysis unit 302, the generation unit 303, the learning unit 402, the distribution transformation unit 403, and an output unit 1504. The reception unit 1501 functions as the reception units 301 and 401. The output unit 1504 includes a transmission unit 1541 and the display unit 342. The transmission unit 1541 functions as the transmission units 341 and 404.

Even when the calculator 1500 functions as the server 100, the calculator 1500 may join federated learning as one site by using the learning data D retained in the calculator 1500. Moreover, for example, the site S6 may function as the server 100 at the time of generation of the integrated learning model in federated learning performed at the sites S6 to S8.

As described above, even when the learning data D is non-iid data, the prediction models M appropriate for the respective sites S can be generated by utilizing a similarity relation between the transformed features TF without a necessity of determining whether or not the learning data D not allowed to be transferred to the outside of the sites S is non-iid data. Accordingly, the server 100 is allowed to generate an appropriate integrated prediction model by federated learning.

Moreover, as the necessity of determining whether or not the learning data D is non-iid data is eliminated, the server 100 is allowed to provide the sites S with such an integrated prediction model which meets a requirement of prohibition of transfer of the learning data D to the outside of the sites S.

Further, while the necessity of determination of whether or not the learning data D is non-iid data is eliminated, the server 100 is also capable of generating an appropriate integrated prediction model even in a case of the learning data D constituting iid data, similarly to the case of non-iid data.

In addition, the analysis device functioning as the server 100 according to Embodiment 1 and Embodiment 2 may also be configured as the following (1) to (13).

(1) An analysis device capable of communicating with a plurality of learning devices as the sites S includes the reception unit 301 that receives the transformed features TF obtained by transforming, in accordance with a predetermined rule, features (training data) contained in the pieces of learning data D individually retained in the plurality of learning devices, the distribution analysis unit 302 that analyzes distributions of a plurality of the features of the plurality of learning devices on the basis of the transformed features TF received by the reception unit 301 for each of the learning devices, and the output unit 304 that outputs a distribution analysis result analyzed by the distribution analysis unit 302.

(2) In the analysis device according to (1) described above, the output unit 304 outputs information associated with similarity between the features of the learning devices, as the distribution analysis result.

(3) In the analysis device according to (1) described above, information associated with similarity between the features of the learning devices is map information that indicates similarity between features of each combination of the two learning devices in the plurality of learning devices.

(4) In the analysis device according to (1) described above, information associated with similarity between the features of the learning devices is the dendrogram 600 that indicates similarity between the features of the plurality of learning devices.

(5) In the analysis device according to (1) described above, the distribution analysis unit 302 selects, for each of the plurality of learning devices, on the basis of the distribution analysis result, any one of a first learning method (local learning method) that generates the prediction model M by using the learning data retained in the corresponding learning device, a federated learning method (non-personalized federated learning method) that generates the one integrated prediction model M100 by federated learning with a different learning device (cluster C3), and a third learning method (personalized federated learning method) that generates one or more prediction models integrated by federated learning with a different learning device having a feature similar to the feature of the corresponding learning device, and determines the selected learning method as a learning method applied to the corresponding learning device. The output unit 304 transmits, to each of the plurality of learning devices, the learning method determined by the distribution analysis unit 302 for the corresponding one of the plurality of learning devices.

(6) In the analysis device according to (5) described above, the distribution analysis unit 302 determines any one of the first learning method, the second learning method, and the third learning method as the learning method applied to the corresponding one of the plurality of learning devices, on the basis of the distribution analysis result.

(7) In the analysis device according to (6) described above, the distribution analysis unit 302 determines any one of the first learning method, the second learning method, and the third learning method as the learning method applied to the corresponding one of the plurality of learning devices, on the basis of distances between the transformed features TF of the plurality of learning devices.

(8) In the analysis device according to (6) described above, the distribution analysis unit 302 determines any one of the first learning method, the second learning method, and the third learning method as the learning method applied to the corresponding one of the plurality of learning devices, on the basis of the transformed features TF and a threshold.

(9) In the analysis device according to (8) described above, the distribution analysis unit 302 determines any one of the first learning method, the second learning method, and the third learning method as the learning method applied to the corresponding one of the plurality of learning devices, on the basis of the transformed features TF, the threshold, and a limiting condition.

(10) In the analysis device according to (9) described above, the limiting condition is the number of the learning devices each having the similar feature.

(11) In the analysis device according to (9) described above, the limiting condition is the number of sets of the learning devices each having the similar feature.

(12) In the analysis device according to (1) described above, the reception unit 301 receives model parameters of identifiers generated by learning of the pieces of learning data individually retained in the plurality of learning devices, the identifiers identifying the respective learning devices. The distribution analysis unit generates an integrated identifier by integrating the identifiers of the learning devices on the basis of the model parameters of the identifiers of the learning devices, the model parameters being received by the reception unit. The transmission unit transmits, to each of the plurality of learning devices, a model parameter of the integrated identifier generated by the distribution analysis unit. The reception unit receives, from each of the plurality of the learning devices, an identification result obtained by the integrated identifier. The distribution analysis unit 302 selects, for each of the plurality of learning devices, on the basis of the identification result received by the reception unit 301 from each of the learning devices, any one of a first learning method (local learning method) that generates the prediction model M by using the learning data retained in the corresponding learning device, a federated learning method (non-personalized federated learning method) that generates the one prediction model M100 integrated by federated learning with a different learning device having a feature similar to the feature of the corresponding learning device (cluster C3), and a third learning method (personalized federated learning method) that generates one or more prediction models integrated by federated learning with a plurality of groups constituted by different learning devices each having a feature similar to the feature of the corresponding learning device, and determines the selected learning method as a learning method applied to the corresponding learning device. The output unit 304 transmits, to each of the plurality of learning devices, the learning method determined by the distribution analysis unit 302 for the corresponding one of the plurality of learning devices.

(13) In the analysis device according to (5) described above, the reception unit 301 receives, from each of the learning devices, the model parameter θ1 of the prediction model M generated by the corresponding learning device on the basis of the learning method determined by the distribution analysis unit 302. The generation unit 303 that generates the prediction model on the basis of the model parameter received by the reception unit 301 from the corresponding learning device is provided.

Note that the present invention is not limited to the embodiments described above, and includes various modifications and equivalent configurations within the spirit of the appended claims. For example, the embodiments are described above in detail only for a purpose of helping easy understanding of the present invention, and therefore, the present invention is not necessarily required to have all the configurations described above. Moreover, a part of the configuration of any one of the embodiments may be replaced with the configuration of the different embodiment. Further, the configuration of any one of the embodiments may be added to the configuration of the different embodiment. In addition, the configuration of each of the embodiments may partially be modified by addition, deletion, or replacement of a different configuration.

Furthermore, a part or all of the respective configurations, functions, processing units, processing means, and the like described above may be implemented by hardware designed using integrated circuits, for example, or may be implemented by software with use of a processor which interprets and executes a program practicing respective functions.

Information such as a program, a table, and a file achieving respective functions may be stored in a storage device such as a memory, a hard disk, and a solid state drive (SSD), or a storage medium such as an integrated circuit (IC) card, an SD card, and a digital versatile disc (DVD).

In addition, control lines and information lines depicted herein are lines considered to be necessary only for explanation, and do not necessarily represent all control lines and information lines necessary for implementation. In actual situations, it may be assumed that almost all configurations are connected to one another.

What is claimed is:

1. An analysis device capable of communicating with a plurality of learning devices, wherein transfer of pieces of learning data to outside of the plurality of learning devices is prohibited, the analysis device comprising:

a processor coupled to a memory storing instructions for the processor to execute:

a reception unit that receives transformed features obtained by transforming, in accordance with a predetermined rule, features contained in the pieces of learning data individually retained in the plurality of learning devices, the transformed features being data transformed to a state enabling transfer outside of the learning devices while the pieces of learning data remain retained in the respective learning devices;

a distribution analysis unit that analyzes distributions of a plurality of the features of the plurality of learning devices on a basis of the transformed features received by the reception unit for each of the learning devices; and an output unit that outputs a distribution analysis result analyzed by the distribution analysis unit, the distribution analysis result enabling generation of a prediction model appropriate for each of the learning devices without transfer of the pieces of learning data to outside of the learning devices.

2. The analysis device according to claim 1, wherein the output unit outputs information associated with similarity between the features of the learning devices, as the distribution analysis result.

3. The analysis device according to claim 1, wherein information associated with similarity between the features of the learning devices is map information that indicates similarity between features of each combination of the two learning devices in the plurality of learning devices.

4. The analysis device according to claim 1, wherein information associated with similarity between the features of the learning devices is a dendrogram that indicates similarity between the features of the plurality of learning devices.

5. The analysis device according to claim 1, wherein the distribution analysis unit selects, for each of the plurality of learning devices, on a basis of the distribution analysis result, any one of a first learning method that generates a prediction model by using the learning data retained in a corresponding learning device, a second learning method that generates one prediction model integrated by federated learning with a different learning device, and a third learning method that generates one or more prediction models integrated by federated learning with a different learning device having a feature similar to the feature of the corresponding learning device, and determines the selected learning method as a learning method applied to the corresponding learning device, and the output unit transmits, to each of the plurality of learning devices, the learning method determined by the distribution analysis unit for the corresponding one of the plurality of learning devices.

6. The analysis device according to claim 5, wherein the distribution analysis unit determines any one of the first learning method, the second learning method, and the third learning method as the learning method applied to the corresponding one of the plurality of learning devices, on a basis of the distribution analysis result.

7. The analysis device according to claim 6, wherein the distribution analysis unit determines any one of the first learning method, the second learning method, and the third learning method as the learning method applied to the corresponding one of the plurality of learning devices, on a basis of distances between the transformed features of the plurality of learning devices.

8. The analysis device according to claim 6, wherein the distribution analysis unit determines any one of the first learning method, the second learning method, and the third learning method as the learning method applied to the corresponding one of the plurality of learning devices, on a basis of the transformed features and a threshold.

9. The analysis device according to claim 8, wherein the distribution analysis unit determines any one of the first learning method, the second learning method, and the third learning method as the learning method applied to the corresponding one of the plurality of learning devices, on a basis of the transformed features, the threshold, and a limiting condition.

10. The analysis device according to claim 9, wherein the limiting condition is a number of the learning devices each having the similar feature.

11. The analysis device according to claim 9, wherein the limiting condition is a number of sets of the learning devices each having the similar feature.

12. The analysis device according to claim 1, wherein the reception unit receives model parameters of identifiers generated by learning of the pieces of learning data individually retained in the plurality of learning devices, the identifiers identifying the respective learning devices, the distribution analysis unit generates an integrated identifier by integrating the identifiers of the learning devices on a basis of the model parameters of the identifiers of the learning devices, the model parameters being received by the reception unit, a transmission unit transmits, to each of the plurality of learning devices, a model parameter of the integrated identifier generated by the distribution analysis unit, the reception unit receives, from each of the plurality of the learning devices, an identification result obtained by the integrated identifier, the distribution analysis unit selects, for each of the plurality of learning devices, on a basis of the identification result received by the reception unit from each of the learning devices, any one of a first learning method that generates a prediction model by using the learning data retained in a corresponding learning device, a federated learning method that generates one prediction model integrated by federated learning with a different learning device having a feature similar to the feature of the corresponding learning device, and a third learning method that generates one or more prediction models integrated by federated learning with a different learning device having a feature similar to the feature of the corresponding learning device, and determines the selected learning method as a learning method applied to the corresponding learning device, and the output unit transmits, to each of the plurality of learning devices, the learning method determined by the distribution analysis unit for the corresponding one of the plurality of learning devices.

13. The analysis device according to claim 5, wherein the reception unit receives, from each of the learning devices, a model parameter of the prediction model generated by the corresponding learning device on a basis of the learning method determined by the distribution analysis unit, and a generation unit that generates the prediction model on a basis of the model parameter received by the reception unit from the corresponding learning device is provided.

14. An analysis method performed by an analysis device capable of communicating with a plurality of learning devices, wherein transfer of pieces of learning data to outside of the plurality of learning devices is prohibited, the analysis method comprising:

a reception process that receives transformed features obtained by transforming, in accordance with a predetermined rule, features contained in the pieces of learning data individually retained in the plurality of learning devices, the transformed features being data transformed to a state enabling transfer outside of the learning devices while the pieces of learning data remain retained in the respective learning devices;

a distribution analysis process that analyzes distributions of a plurality of the features of the plurality of learning devices on a basis of the transformed features received by the reception process for each of the learning devices; and an output process that outputs a distribution analysis result analyzed by the distribution analysis process, the distribution analysis result enabling generation of a prediction model appropriate for each of the learning devices without transfer of the pieces of learning data to outside of the learning devices.

15. A non-transitory processor-readable recording medium having an analysis program recorded thereon to be executed by a processor of an analysis device capable of communicating with a plurality of learning devices, wherein transfer of pieces of learning data to outside of the plurality of learning devices is prohibited, the analysis program causing the processor to execute:

a reception process that receives transformed features obtained by transforming, in accordance with a predetermined rule, features contained in the pieces of learning data individually retained in the plurality of learning devices, the transformed features being data transformed to a state enabling transfer outside of the learning devices while the pieces of learning data remain retained in the respective learning devices;

a distribution analysis process that analyzes distributions of a plurality of the features of the plurality of learning devices on a basis of the transformed features received by the reception process for each of the learning devices; and an output process that outputs a distribution analysis result analyzed by the distribution analysis process, the distribution analysis result enabling generation of a prediction model appropriate for each of the learning devices without transfer of the pieces of learning data to outside of the learning devices.

16. The analysis device according to claim 1, wherein the processor further executes a generation unit that generates one or more integrated prediction models by executing an integration process using model parameters of prediction models transmitted from the plurality of learning devices, wherein the model parameters are transmitted to the analysis device instead of the pieces of learning data.

17. The analysis device according to claim 1, wherein the output unit comprises a transmission unit that transmits, to each of the plurality of learning devices, a notification of execution of a learning method selected from a local learning method, a non-personalized federated learning method, and a personalized federated learning method, based on the distribution analysis result.

18. The analysis device according to claim 1, wherein the distribution analysis unit executes hierarchical clustering of the transformed features to generate a dendrogram indicating distances between the plurality of learning devices, and determines clusters of learning devices having similar features based on the dendrogram.

19. The analysis device according to claim 1, wherein the transformed features are feature vectors generated by averaging training data samples in the pieces of learning data in directions of the samples, each feature vector being constituted by an average value for each of a plurality of features.

20. The analysis device according to claim 1, wherein the distribution analysis unit calculates similarity between the pieces of learning data for each combination of two learning devices among the plurality of learning devices using distances between the transformed features, and determines learning devices having similar distributions of learning data as a cluster for federated learning.

* * * * *